(12) United States Patent
Kisenwether et al.

(10) Patent No.: US 8,613,655 B2
(45) Date of Patent: Dec. 24, 2013

(54) FACILITATING GROUP PLAY WITH MULTIPLE GAME DEVICES

(75) Inventors: Joseph Kisenwether, Sparks, NV (US); Jeff Mincey, Reno, NV (US); Loren Nelson, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 1214 days.

(21) Appl. No.: 12/112,386

(22) Filed: Apr. 30, 2008

(65) Prior Publication Data

US 2009/0275410 A1    Nov. 5, 2009

(51) Int. Cl.
*A63F 13/10* (2006.01)
*A63F 13/12* (2006.01)

(52) U.S. Cl.
USPC ............ 463/21; 463/16; 463/17; 463/18; 463/19; 463/20; 463/26; 463/28; 463/42

(58) Field of Classification Search
USPC .............................. 463/16–20, 26–28, 42, 21
See application file for complete search history.

(56) References Cited

U.S. PATENT DOCUMENTS

| | | | |
|---|---|---|---|
| 1,361,202 A | 12/1920 | Thomas | |
| 1,599,390 A | 9/1926 | Albert | |
| 1,727,800 A | 9/1929 | Albert | |
| 1,890,504 A | 12/1932 | Ferguson, Jr. | |
| 2,567,223 A | 9/1951 | Maher et al. | |
| 2,595,845 A | 5/1952 | Hagwell | |
| 2,663,418 A | 12/1953 | Grunwald | |
| 2,694,662 A | 11/1954 | Hunter, Jr. | |
| 2,731,271 A | 1/1956 | Brown | |
| 3,222,071 A | 12/1965 | Lang | |
| 3,312,473 A | 4/1967 | Friedman et al. | |
| 3,339,223 A | 9/1967 | Laby | |
| 3,377,070 A | 4/1968 | Nottoli | |
| 3,493,728 A | 2/1970 | Braden et al. | |
| 3,561,756 A | 2/1971 | Barnett | |
| 3,667,759 A | 6/1972 | Barr | |
| 3,690,670 A | 9/1972 | Cassady et al. | |
| 3,735,982 A | 5/1973 | Gerfin | |
| 3,740,742 A | 6/1973 | Thompson et al. | |

(Continued)

FOREIGN PATENT DOCUMENTS

| DE | 199 40 954 | 3/2001 |
|---|---|---|
| EP | 1 463 008 A2 | 9/2004 |

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Arthur O. Hall
*Assistant Examiner* — Bach Hoang
(74) *Attorney, Agent, or Firm* — Frank Abramonte; Fearon Brown; Marvin Hein

(57) ABSTRACT

Techniques are describe for providing group play events with multiple game devices. Group play events are triggered by any game device that qualifies to participate, so that when any qualifying game device triggers a group play event, all qualifying game devices participate in the group play event. In some situations, a probability for triggering a group play event is adjusted to accommodate for a dynamically changing number of game devices that qualify over time.

29 Claims, 7 Drawing Sheets

(56) References Cited

U.S. PATENT DOCUMENTS

| | | |
|---|---|---|
| 3,751,041 A | 8/1973 | Seifert |
| 3,752,962 A | 8/1973 | Greskovics |
| 3,766,452 A | 10/1973 | Burpee et al. |
| 3,787,660 A | 1/1974 | Meyers et al. |
| 3,810,172 A | 5/1974 | Burpee et al. |
| 3,814,436 A | 6/1974 | Boren |
| 3,897,954 A | 8/1975 | Erickson et al. |
| 3,907,282 A | 9/1975 | Hunter |
| 3,929,339 A | 12/1975 | Mattioli |
| 3,937,311 A | 2/1976 | Gehrke |
| 3,937,312 A | 2/1976 | Gehrke |
| 3,942,616 A | 3/1976 | Elmore |
| 3,966,047 A | 6/1976 | Steiner |
| 3,972,573 A | 8/1976 | Marola |
| 3,990,555 A | 11/1976 | Carullo |
| 3,993,176 A | 11/1976 | Marola et al. |
| 3,993,177 A | 11/1976 | Gehrke |
| 3,994,377 A | 11/1976 | Elmore |
| 4,023,167 A | 5/1977 | Wahlstrom |
| 4,026,309 A | 5/1977 | Howard |
| 4,031,376 A | 6/1977 | Corkin, Jr. ............... 235/156 |
| 4,095,795 A | 6/1978 | Saxton et al. |
| 4,108,361 A | 8/1978 | Krause |
| 4,135,663 A | 1/1979 | Nojiri et al. |
| 4,241,921 A | 12/1980 | Miller |
| 4,244,582 A | 1/1981 | Raees et al. |
| 4,264,074 A | 4/1981 | Sobajima |
| 4,283,708 A | 8/1981 | Lee |
| 4,310,160 A | 1/1982 | Willette et al. |
| 4,339,798 A | 7/1982 | Hedges et al. |
| 4,373,726 A | 2/1983 | Churchill et al. |
| 4,377,285 A | 3/1983 | Kadlic |
| 4,428,582 A | 1/1984 | Smith |
| 4,448,419 A | 5/1984 | Telnaes |
| 4,457,512 A | 7/1984 | Stevenson |
| 4,467,424 A | 8/1984 | Hedges et al. |
| 4,470,496 A | 9/1984 | Steiner |
| 4,475,564 A | 10/1984 | Koester et al. |
| 4,482,058 A | 11/1984 | Steiner |
| 4,497,488 A | 2/1985 | Plevyak et al. |
| 4,503,963 A | 3/1985 | Steiner |
| 4,510,490 A | 4/1985 | Anderson, III et al. |
| 4,512,580 A | 4/1985 | Matviak |
| 4,517,558 A | 5/1985 | Davids |
| 4,517,654 A | 5/1985 | Carmean |
| 4,518,001 A | 5/1985 | Branham |
| 4,531,117 A | 7/1985 | Nourse et al. |
| 4,531,187 A | 7/1985 | Uhland |
| 4,531,909 A | 7/1985 | Takeshita |
| 4,534,562 A | 8/1985 | Cuff et al. |
| 4,574,824 A | 3/1986 | Paulsen et al. |
| 4,586,712 A | 5/1986 | Lorber et al. |
| 4,588,292 A | 5/1986 | Collins |
| 4,592,377 A | 6/1986 | Paulsen et al. |
| 4,621,814 A | 11/1986 | Stepan et al. |
| 4,635,937 A | 1/1987 | Dickinson et al. |
| 4,636,846 A | 1/1987 | Villarreal |
| 4,636,896 A | 1/1987 | Takikawa |
| 4,650,057 A | 3/1987 | Koester |
| 4,656,463 A | 4/1987 | Anders et al. |
| 4,659,082 A | 4/1987 | Greenberg |
| 4,660,025 A | 4/1987 | Humphrey |
| 4,660,833 A | 4/1987 | Dickinson et al. |
| 4,662,637 A | 5/1987 | Pfeiffer |
| 4,667,959 A | 5/1987 | Pfeiffer et al. |
| 4,693,477 A | 9/1987 | Dickinson et al. |
| 4,693,480 A | 9/1987 | Smith |
| 4,711,452 A | 12/1987 | Dickinson et al. |
| 4,721,307 A | 1/1988 | Okada ............... 273/143 R |
| 4,725,079 A | 2/1988 | Koza et al. |
| 4,728,108 A | 3/1988 | Neuwahl |
| 4,746,830 A | 5/1988 | Holland |
| 4,750,743 A | 6/1988 | Nicoletti |
| 4,755,941 A | 7/1988 | Bacchi ............... 364/412 |
| 4,770,421 A | 9/1988 | Hoffman |
| 4,802,218 A | 1/1989 | Wright et al. |
| 4,807,884 A | 2/1989 | Breeding |
| 4,814,589 A | 3/1989 | Storch et al. |
| 4,817,528 A | 4/1989 | Baker |
| 4,822,050 A | 4/1989 | Normand et al. |
| 4,832,341 A | 5/1989 | Muller et al. |
| 4,832,342 A | 5/1989 | Plevyak et al. |
| 4,837,728 A | 6/1989 | Barrie et al. ............... 364/412 |
| 4,859,991 A | 8/1989 | Watkins et al. |
| 4,861,041 A | 8/1989 | Jones et al. ............... 273/292 |
| 4,870,391 A | 9/1989 | Cooper |
| 4,885,700 A | 12/1989 | Kondziolka et al. |
| 4,889,367 A | 12/1989 | Miller |
| 4,920,335 A | 4/1990 | Andrews |
| 4,926,996 A | 5/1990 | Eglise et al. |
| 4,948,138 A | 8/1990 | Pease et al. |
| 4,951,950 A | 8/1990 | Normand et al. |
| 4,969,648 A | 11/1990 | Hollinger et al. |
| 4,973,851 A | 11/1990 | Lee |
| 4,978,322 A | 12/1990 | Paulsen |
| 4,995,615 A | 2/1991 | Cheng |
| 4,998,737 A | 3/1991 | Lamle |
| 5,000,453 A | 3/1991 | Stevens et al. |
| 5,007,641 A | 4/1991 | Seidman |
| 5,031,914 A | 7/1991 | Rosenthal |
| 5,039,102 A | 8/1991 | Miller |
| 5,042,809 A | 8/1991 | Richardson |
| 5,050,881 A | 9/1991 | Nagao |
| 5,053,612 A | 10/1991 | Pielemeier et al. |
| 5,058,893 A | 10/1991 | Dickinson et al. |
| 5,067,713 A | 11/1991 | Soules et al. |
| 5,067,724 A | 11/1991 | Rinkavage |
| 5,067,725 A | 11/1991 | Leach |
| 5,083,800 A | 1/1992 | Lockton |
| 5,096,197 A | 3/1992 | Embury |
| 5,100,137 A | 3/1992 | Fulton ............... 273/85 CP |
| 5,103,081 A | 4/1992 | Fisher et al. |
| 5,103,234 A | 4/1992 | Watkins et al. |
| 5,110,134 A | 5/1992 | Laughlin et al. |
| 5,114,153 A | 5/1992 | Rosenwinkel et al. |
| 5,121,921 A | 6/1992 | Friedman et al. |
| 5,154,419 A | 10/1992 | Madhavan |
| 5,156,397 A | 10/1992 | Valenza, Jr. |
| 5,157,602 A | 10/1992 | Fields et al. |
| 5,166,502 A | 11/1992 | Rendleman et al. |
| 5,167,411 A | 12/1992 | Isobe |
| 5,167,413 A | 12/1992 | Fulton ............... 273/85 CP |
| 5,167,571 A | 12/1992 | Waller |
| 5,178,389 A | 1/1993 | Bentley et al. |
| 5,179,517 A | 1/1993 | Sarbin et al. ............... 364/410 |
| 5,184,821 A | 2/1993 | Korenek |
| 5,186,464 A | 2/1993 | Lamle |
| 5,188,363 A | 2/1993 | Marnell, II et al. |
| 5,199,710 A | 4/1993 | Lamle |
| 5,216,234 A | 6/1993 | Bell |
| 5,224,712 A | 7/1993 | Laughlin et al. |
| 5,240,140 A | 8/1993 | Huen |
| 5,242,041 A | 9/1993 | Isobe |
| 5,242,163 A | 9/1993 | Fulton ............... 273/85 CP |
| 5,248,142 A | 9/1993 | Breeding ............... 273/138 R |
| 5,251,897 A | 10/1993 | Fulton ............... 273/85 CP |
| 5,258,837 A | 11/1993 | Gormley |
| 5,259,907 A | 11/1993 | Soules et al. |
| 5,261,667 A | 11/1993 | Breeding |
| 5,265,874 A | 11/1993 | Dickinson et al. |
| 5,273,281 A | 12/1993 | Lovell |
| 5,275,400 A | 1/1994 | Weingardt et al. ......... 273/85 CP |
| 5,275,411 A | 1/1994 | Breeding |
| 5,283,422 A | 2/1994 | Storch et al. |
| 5,288,081 A | 2/1994 | Breeding |
| 5,303,921 A | 4/1994 | Breeding |
| 5,312,104 A | 5/1994 | Miller |
| 5,319,181 A | 6/1994 | Shellhammer et al. |
| 5,321,241 A | 6/1994 | Craine ............... 235/380 |
| 5,322,295 A | 6/1994 | Cabot et al. |
| 5,324,035 A | 6/1994 | Morris et al. |
| 5,326,104 A | 7/1994 | Pease et al. |
| 5,332,219 A | 7/1994 | Marnell, II et al. ....... 273/138 A |
| 5,343,028 A | 8/1994 | Figarella et al. |

(56) References Cited

U.S. PATENT DOCUMENTS

| | | | |
|---|---|---|---|
| 5,344,144 A | 9/1994 | Canon .................. 273/138 A |
| 5,344,146 A | 9/1994 | Lee |
| 5,356,145 A | 10/1994 | Verschoor |
| 5,361,885 A | 11/1994 | Modler |
| 5,362,053 A | 11/1994 | Miller |
| 5,364,104 A | 11/1994 | Jones et al. ................. 273/292 |
| 5,374,061 A | 12/1994 | Albrecht |
| 5,381,019 A | 1/1995 | Sato |
| 5,382,024 A | 1/1995 | Blaha |
| 5,386,103 A | 1/1995 | DeBan et al. |
| 5,389,945 A | 2/1995 | Sheridon |
| 5,393,067 A | 2/1995 | Paulsen et al. ............... 273/292 |
| 5,411,257 A | 5/1995 | Fulton ........................ 273/85 CP |
| 5,417,430 A | 5/1995 | Breeding .................... 273/292 |
| 5,431,408 A | 7/1995 | Adams ....................... 273/306 |
| 5,437,451 A | 8/1995 | Fulton ..................... 273/138 A |
| 5,466,010 A | 11/1995 | Spooner ......................... 283/67 |
| 5,472,194 A | 12/1995 | Breeding et al. ......... 273/138 A |
| 5,505,461 A | 4/1996 | Bell et al. ................... 273/433 |
| 5,513,851 A | 5/1996 | Harris ........................ 273/274 |
| 5,544,892 A | 8/1996 | Breeding .................... 273/292 |
| 5,544,893 A | 8/1996 | Jones et al. ................. 273/309 |
| 5,562,284 A | 10/1996 | Stevens ....................... 273/139 |
| 5,564,700 A | 10/1996 | Celona .......................... 463/27 |
| 5,570,885 A | 11/1996 | Ornstein ....................... 463/27 |
| 5,586,936 A | 12/1996 | Bennett et al. ............... 463/25 |
| 5,605,334 A | 2/1997 | McCrea, Jr. ................. 273/309 |
| 5,613,912 A | 3/1997 | Slater ........................... 463/25 |
| 5,636,842 A | 6/1997 | Cabot et al. ................. 273/292 |
| 5,636,843 A | 6/1997 | Roberts ...................... 273/292 |
| 5,639,088 A | 6/1997 | Schneider et al. ........ 273/138.2 |
| 5,643,088 A | 7/1997 | Vaughn et al. ................ 463/40 |
| 5,645,486 A | 7/1997 | Nagao et al. .................. 463/27 |
| 5,651,548 A | 7/1997 | French et al. ............... 273/309 |
| 5,653,635 A | 8/1997 | Breeding ....................... 463/11 |
| 5,655,961 A | 8/1997 | Acres et al. ................... 463/27 |
| 5,685,774 A | 11/1997 | Webb ............................ 463/13 |
| 5,698,839 A | 12/1997 | Jagielinski et al. ........... 235/493 |
| 5,707,287 A | 1/1998 | McCrea, Jr. ................... 463/27 |
| 5,711,525 A | 1/1998 | Breeding .................... 273/292 |
| 5,735,525 A | 4/1998 | McCrea, Jr. ................. 273/309 |
| 5,735,742 A | 4/1998 | French .......................... 463/25 |
| 5,743,800 A | 4/1998 | Huard et al. |
| 5,766,075 A | 6/1998 | Cook et al. .................... 463/25 |
| 5,766,076 A | 6/1998 | Pease et al. ................... 463/27 |
| 5,788,574 A | 8/1998 | Ornstein et al. .............. 463/25 |
| 5,794,964 A | 8/1998 | Jones et al. ................. 273/309 |
| 5,795,225 A | 8/1998 | Jones et al. ................... 463/13 |
| 5,803,808 A | 9/1998 | Strisower ...................... 463/11 |
| 5,803,809 A | 9/1998 | Yoseloff ........................ 463/13 |
| 5,813,912 A | 9/1998 | Shultz .......................... 463/25 |
| 5,816,918 A | 10/1998 | Kelly et al. |
| 5,823,534 A | 10/1998 | Banyai ........................ 273/269 |
| 5,823,879 A | 10/1998 | Goldberg et al. .............. 463/42 |
| 5,831,669 A | 11/1998 | Adrain ......................... 348/143 |
| 5,836,586 A | 11/1998 | Marks et al. ................. 273/292 |
| 5,839,730 A | 11/1998 | Pike ............................ 273/292 |
| 5,842,921 A | 12/1998 | Mindes et al. ................. 463/16 |
| 5,846,132 A | 12/1998 | Junkin .......................... 463/42 |
| 5,851,011 A | 12/1998 | Lott ............................ 273/292 |
| 5,851,148 A | 12/1998 | Brune et al. .................. 463/25 |
| 5,855,515 A | 1/1999 | Pease et al. ................... 463/27 |
| 5,871,213 A | 2/1999 | Chadband et al. ........... 273/292 |
| 5,885,158 A | 3/1999 | Torango et al. ................ 463/27 |
| 5,890,963 A | 4/1999 | Yen ............................... 463/42 |
| 5,911,418 A | 6/1999 | Adams ....................... 273/274 |
| 5,911,419 A | 6/1999 | Delaney et al. ............. 273/292 |
| 5,911,626 A | 6/1999 | McCrea, Jr. ................... 463/27 |
| 5,919,090 A | 7/1999 | Mothwurf ...................... 463/25 |
| 5,934,999 A | 8/1999 | Valdez .......................... 463/17 |
| 6,001,016 A | 12/1999 | Walker et al. .................. 463/42 |
| 6,003,013 A | 12/1999 | Boushy et al. ................ 705/10 |
| 6,004,205 A | 12/1999 | Lauretta et al. ............... 463/11 |
| 6,010,404 A | 1/2000 | Walker et al. .................. 463/21 |
| 6,019,374 A | 2/2000 | Breeding .................... 273/292 |
| 6,032,955 A | 3/2000 | Luciano et al. ............ 273/138.1 |
| 6,039,650 A | 3/2000 | Hill ............................... 463/47 |
| 6,045,130 A | 4/2000 | Jones et al. .................. 273/292 |
| 6,056,641 A | 5/2000 | Webb ............................ 463/13 |
| 6,059,289 A | 5/2000 | Vancura ..................... 273/143 R |
| 6,062,565 A | 5/2000 | Chadband et al. ........... 273/292 |
| 6,062,981 A | 5/2000 | Luciano, Jr. ................... 463/26 |
| 6,068,553 A | 5/2000 | Parker ........................... 463/27 |
| 6,070,878 A | 6/2000 | Jones et al. .................. 273/309 |
| 6,089,978 A | 7/2000 | Adams .......................... 463/20 |
| 6,089,980 A | 7/2000 | Gauselmann ................. 463/27 |
| 6,093,103 A | 7/2000 | McCrea, Jr. ................... 463/27 |
| 6,099,407 A | 8/2000 | Parker, Jr. et al. ............. 463/19 |
| 6,102,799 A | 8/2000 | Stupak ........................... 463/27 |
| 6,105,964 A | 8/2000 | Maahs ........................ 273/292 |
| 6,106,395 A | 8/2000 | Begis ............................ 463/23 |
| 6,110,041 A | 8/2000 | Walker et al. ................. 463/20 |
| 6,110,043 A | 8/2000 | Olsen ............................ 463/27 |
| 6,113,493 A | 9/2000 | Walker et al. ................. 463/25 |
| 6,117,012 A | 9/2000 | McCrea, Jr. ................... 463/27 |
| 6,120,377 A | 9/2000 | McGinnis, Sr. et al. ........ 463/20 |
| 6,123,333 A | 9/2000 | McGinnis, Sr. et al. ...... 273/146 |
| 6,126,542 A | 10/2000 | Fier ............................... 463/16 |
| 6,135,453 A | 10/2000 | Srichayaporn ............... 273/292 |
| 6,142,872 A * | 11/2000 | Walker et al. ................. 463/16 |
| 6,142,876 A | 11/2000 | Cumbers ....................... 463/25 |
| 6,146,273 A | 11/2000 | Olsen ............................ 463/27 |
| 6,152,822 A | 11/2000 | Herbert ......................... 463/22 |
| 6,154,131 A | 11/2000 | Jones, II et al. ............... 340/540 |
| 6,155,925 A | 12/2000 | Giobbi et al. ................. 463/20 |
| 6,165,069 A | 12/2000 | Sines et al. .................... 463/12 |
| 6,165,071 A | 12/2000 | Weiss ............................ 463/24 |
| 6,168,523 B1 | 1/2001 | Piechowiak et al. ........... 463/26 |
| 6,179,711 B1 | 1/2001 | Yoseloff ........................ 463/25 |
| 6,183,362 B1 | 2/2001 | Boushy ......................... 463/25 |
| 6,183,366 B1 | 2/2001 | Goldberg et al. .............. 463/42 |
| 6,186,894 B1 | 2/2001 | Mayeroff ...................... 463/20 |
| 6,186,895 B1 | 2/2001 | Oliver ........................... 463/25 |
| 6,203,430 B1 | 3/2001 | Walker et al. ................. 463/20 |
| 6,206,782 B1 | 3/2001 | Walker et al. ................. 463/25 |
| 6,210,275 B1 | 4/2001 | Olsen ............................ 463/16 |
| 6,210,277 B1 | 4/2001 | Stefan .......................... 463/27 |
| 6,213,877 B1 | 4/2001 | Walker et al. ................. 463/26 |
| 6,224,483 B1 | 5/2001 | Mayeroff ...................... 463/20 |
| 6,224,484 B1 | 5/2001 | Okuda et al. .................. 463/27 |
| 6,227,969 B1 | 5/2001 | Yoseloff ........................ 463/13 |
| 6,244,958 B1 | 6/2001 | Acres ............................ 463/26 |
| 6,254,484 B1 | 7/2001 | McCrea, Jr. ................... 463/27 |
| 6,267,671 B1 | 7/2001 | Hogan .......................... 463/25 |
| 6,273,424 B1 | 8/2001 | Breeding .................... 273/292 |
| 6,290,603 B1 | 9/2001 | Luciano, Jr. ................... 463/25 |
| 6,293,864 B1 | 9/2001 | Romero ........................ 463/12 |
| 6,299,536 B1 | 10/2001 | Hill ............................... 463/47 |
| 6,302,793 B1 | 10/2001 | Fertitta, III et al. ............ 463/25 |
| 6,309,300 B1 | 10/2001 | Glavich ......................... 463/26 |
| 6,312,332 B1 | 11/2001 | Walker et al. ................. 463/23 |
| 6,312,334 B1 | 11/2001 | Yoseloff ........................ 463/25 |
| 6,315,664 B1 | 11/2001 | Baerlocher et al. ............ 463/21 |
| 6,322,078 B1 | 11/2001 | Adams ....................... 273/292 |
| 6,328,649 B1 | 12/2001 | Randall et al. ................. 463/20 |
| 6,334,614 B1 | 1/2002 | Breeding .................... 273/292 |
| 6,334,814 B1 | 1/2002 | Adams .......................... 463/20 |
| 6,336,863 B1 | 1/2002 | Baerlocher et al. ............ 463/27 |
| 6,346,043 B1 | 2/2002 | Colin et al. .................... 463/17 |
| 6,346,044 B1 | 2/2002 | McCrea, Jr. ................... 463/27 |
| 6,350,199 B1 | 2/2002 | Williams et al. ............... 463/16 |
| 6,364,767 B1 | 4/2002 | Brossard et al. ............... 463/20 |
| 6,375,187 B1 | 4/2002 | Baerlocher ................. 273/143 R |
| 6,375,569 B1 | 4/2002 | Acres ........................... 463/27 |
| 6,390,921 B1 | 5/2002 | Busch et al. .................. 463/42 |
| 6,394,902 B1 | 5/2002 | Glavich ......................... 463/20 |
| 6,406,023 B1 | 6/2002 | Rowe ......................... 273/292 |
| 6,406,369 B1 | 6/2002 | Baerlocher et al. ............ 463/20 |
| 6,409,595 B1 | 6/2002 | Uihlein et al. ................. 463/29 |
| 6,413,161 B1 | 7/2002 | Baerlocher et al. ............ 463/20 |
| 6,413,162 B1 | 7/2002 | Baerlocher et al. ............ 463/20 |
| 6,416,408 B2 | 7/2002 | Tracy et al. .................... 463/16 |
| 6,419,583 B1 | 7/2002 | Crumby et al. ................ 463/42 |
| 6,425,824 B1 | 7/2002 | Baerlocher et al. ............ 463/16 |

(56) References Cited

U.S. PATENT DOCUMENTS

| | | | |
|---|---|---|---|
| 6,439,995 B1 | 8/2002 | Hughs-Baird et al. | 463/20 |
| 6,443,452 B1 | 9/2002 | Brune | 273/143 R |
| 6,446,864 B1 | 9/2002 | Kim et al. | 235/382 |
| 6,454,266 B1 | 9/2002 | Breeding et al. | 273/292 |
| 6,460,848 B1 | 10/2002 | Soltys et al. | 273/149 R |
| 6,461,241 B1 | 10/2002 | Webb et al. | 463/20 |
| 6,464,582 B1 | 10/2002 | Baerlocher et al. | 463/20 |
| 6,464,584 B2 | 10/2002 | Oliver | 463/25 |
| 6,468,156 B1 | 10/2002 | Hughs-Baird et al. | 463/25 |
| 6,471,208 B2 | 10/2002 | Yoseloff et al. | 273/143 R |
| 6,471,591 B1 | 10/2002 | Crumby | 463/26 |
| 6,481,713 B2 | 11/2002 | Perrie et al. | |
| 6,494,454 B2 | 12/2002 | Adams | 273/292 |
| 6,494,785 B1 | 12/2002 | Gerrard et al. | 463/20 |
| 6,497,408 B1 | 12/2002 | Walker et al. | 273/138.1 |
| 6,506,118 B1 | 1/2003 | Baerlocher et al. | 463/25 |
| 6,508,709 B1 | 1/2003 | Karmarkar | 463/42 |
| 6,508,710 B1 | 1/2003 | Paravia et al. | 463/42 |
| 6,511,375 B1 | 1/2003 | Kaminkow | 463/20 |
| 6,514,140 B1 | 2/2003 | Storch | 463/25 |
| 6,514,141 B1 | 2/2003 | Kaminkow et al. | 463/25 |
| 6,517,435 B2 | 2/2003 | Soltys et al. | 463/25 |
| 6,517,436 B2 | 2/2003 | Soltys et al. | 463/29 |
| 6,520,857 B2 | 2/2003 | Soltys et al. | 463/29 |
| 6,527,271 B2 | 3/2003 | Soltys et al. | 273/148 R |
| 6,530,836 B2 | 3/2003 | Soltys et al. | 463/29 |
| 6,530,837 B2 | 3/2003 | Soltys et al. | 463/29 |
| 6,533,276 B2 | 3/2003 | Soltys et al. | 273/148 R |
| 6,533,662 B2 | 3/2003 | Soltys et al. | 463/25 |
| 6,561,900 B1 | 5/2003 | Baerlocher et al. | 463/20 |
| 6,565,433 B1 | 5/2003 | Baerlocher et al. | 463/20 |
| 6,565,436 B1 | 5/2003 | Baerlocher | 463/26 |
| 6,569,015 B1 | 5/2003 | Baerlocher et al. | 463/16 |
| 6,572,472 B1 | 6/2003 | Glavich | 463/16 |
| 6,572,473 B1 | 6/2003 | Baerlocher | 463/20 |
| 6,575,829 B2 | 6/2003 | Coleman et al. | 463/20 |
| 6,579,180 B2 | 6/2003 | Soltys et al. | 463/25 |
| 6,579,181 B2 | 6/2003 | Soltys et al. | 463/25 |
| 6,582,306 B1 | 6/2003 | Kaminkow | 463/20 |
| 6,582,307 B2 | 6/2003 | Webb | 463/22 |
| 6,585,588 B2 | 7/2003 | Hartl | 463/16 |
| 6,585,591 B1 | 7/2003 | Baerlocher et al. | 463/25 |
| 6,585,592 B1 | 7/2003 | Crumby | 463/26 |
| 6,592,458 B1 | 7/2003 | Ho | 463/17 |
| 6,595,854 B2 | 7/2003 | Hughs-Baird et al. | 463/20 |
| 6,595,857 B2 | 7/2003 | Soltys et al. | 463/29 |
| 6,599,185 B1 | 7/2003 | Kaminkow et al. | 463/16 |
| 6,599,192 B1 | 7/2003 | Baerlocher et al. | 463/25 |
| 6,599,193 B2 | 7/2003 | Baerlocher et al. | 463/27 |
| 6,602,135 B2 | 8/2003 | Gerrard | 463/16 |
| 6,602,136 B1 | 8/2003 | Baerlocher et al. | 463/16 |
| 6,602,137 B2 | 8/2003 | Kaminkow et al. | 463/16 |
| 6,605,000 B2 | 8/2003 | Adams | 463/20 |
| 6,607,438 B2 | 8/2003 | Baerlocher et al. | 463/16 |
| 6,609,974 B2 | 8/2003 | Mead et al. | 463/25 |
| 6,620,046 B2 | 9/2003 | Rowe | 463/25 |
| 6,629,889 B2 | 10/2003 | Mothwurf | 463/25 |
| 6,632,139 B1 | 10/2003 | Baerlocher | 463/16 |
| 6,634,943 B1 | 10/2003 | Baerlocher | 463/25 |
| 6,634,945 B2 | 10/2003 | Glavich et al. | 463/25 |
| 6,638,164 B2 | 10/2003 | Randall et al. | 463/20 |
| 6,641,484 B2 | 11/2003 | Oles et al. | 463/47 |
| 6,645,073 B2 | 11/2003 | Lemay et al. | 463/20 |
| 6,645,078 B1 | 11/2003 | Mattice | 463/42 |
| 6,648,753 B1 | 11/2003 | Tracy et al. | 463/16 |
| 6,648,754 B2 | 11/2003 | Baerlocher et al. | 463/17 |
| 6,651,985 B2 | 11/2003 | Sines et al. | 273/309 |
| 6,656,040 B1 | 12/2003 | Brosnan et al. | 463/16 |
| 6,656,048 B2 | 12/2003 | Olsen | 463/25 |
| 6,659,461 B2 | 12/2003 | Yoseloff et al. | 273/274 |
| 6,659,864 B2 | 12/2003 | McGahn et al. | 463/16 |
| 6,663,488 B1 | 12/2003 | Adams | 463/17 |
| 6,663,489 B2 | 12/2003 | Baerlocher | 463/20 |
| 6,663,490 B2 | 12/2003 | Soltys et al. | 463/25 |
| 6,669,559 B1 | 12/2003 | Baerlocher et al. | 463/16 |
| 6,672,589 B1 | 1/2004 | Lemke et al. | 273/236 |
| 6,682,423 B2 | 1/2004 | Brosnan et al. | 463/29 |
| 6,685,564 B2 | 2/2004 | Oliver | 463/25 |
| 6,688,975 B2 | 2/2004 | Baerlocher et al. | 463/16 |
| 6,688,977 B1 | 2/2004 | Baerlocher et al. | 463/25 |
| 6,688,979 B2 | 2/2004 | Soltys et al. | 463/25 |
| 6,692,354 B2 | 2/2004 | Tracy et al. | 463/16 |
| 6,692,355 B2 | 2/2004 | Baerlocher et al. | 463/16 |
| 6,702,291 B2 | 3/2004 | Grebler et al. | |
| 6,712,695 B2 | 3/2004 | Mothwurf et al. | 463/25 |
| 6,712,696 B2 | 3/2004 | Soltys et al. | 463/25 |
| 6,712,698 B2 | 3/2004 | Paulsen et al. | 463/30 |
| 6,719,632 B2 | 4/2004 | Palmer et al. | 463/25 |
| 6,722,974 B2 | 4/2004 | Sines et al. | 463/12 |
| 6,722,981 B2 | 4/2004 | Kaminkow et al. | 463/25 |
| 6,722,982 B2 | 4/2004 | Kaminkow et al. | 463/25 |
| 6,722,983 B2 | 4/2004 | Kaminkow et al. | 463/26 |
| 6,722,985 B2 | 4/2004 | Criss-Puszkiewicz et al. | 463/29 |
| 6,726,563 B1 | 4/2004 | Baerlocher et al. | 463/25 |
| 6,726,565 B2 | 4/2004 | Hughs-Baird | 463/25 |
| 6,728,740 B2 | 4/2004 | Kelly et al. | 708/250 |
| 6,729,956 B2 | 5/2004 | Wolf et al. | 463/25 |
| 6,733,386 B2 | 5/2004 | Cuddy et al. | 463/17 |
| 6,733,389 B2 | 5/2004 | Webb et al. | 463/20 |
| 6,739,973 B1 | 5/2004 | Lucchesi et al. | 463/35 |
| 6,743,102 B1 | 6/2004 | Fiechter et al. | |
| 6,749,504 B2 | 6/2004 | Hughs-Baird | 463/25 |
| 6,755,741 B1 | 6/2004 | Rafaeli | 463/25 |
| 6,758,747 B2 | 7/2004 | Baerlocher | 463/16 |
| 6,758,750 B2 | 7/2004 | Baerlocher et al. | 463/25 |
| 6,758,751 B2 | 7/2004 | Soltys et al. | 463/29 |
| 6,769,983 B2 | 8/2004 | Slomiany | 463/16 |
| 6,789,801 B2 | 9/2004 | Snow | 273/292 |
| 6,800,029 B2 | 10/2004 | Rowe et al. | 463/25 |
| 6,808,173 B2 | 10/2004 | Snow | 273/292 |
| 6,811,486 B1 | 11/2004 | Luciano, Jr. | 463/24 |
| 6,817,948 B2 | 11/2004 | Pascal et al. | 463/42 |
| 6,837,789 B2 | 1/2005 | Garahi et al. | 463/29 |
| 6,846,238 B2 | 1/2005 | Wells | 463/39 |
| 6,848,994 B1 | 2/2005 | Knust et al. | 463/25 |
| 6,874,786 B2 | 4/2005 | Bruno et al. | 273/306 |
| 6,896,618 B2 | 5/2005 | Benoy et al. | 463/25 |
| 6,923,446 B2 | 8/2005 | Snow | 273/292 |
| 6,938,900 B2 | 9/2005 | Snow | 273/292 |
| 6,955,599 B2 | 10/2005 | Bourbour et al. | 463/13 |
| 6,960,134 B2 | 11/2005 | Hartl et al. | 463/20 |
| 6,969,319 B2 | 11/2005 | Rowe et al. | 463/25 |
| 6,972,682 B2 | 12/2005 | Lareau et al. | |
| 6,986,514 B2 | 1/2006 | Snow | 273/292 |
| 6,991,544 B2 | 1/2006 | Soltys et al. | 463/42 |
| 7,000,921 B2 | 2/2006 | Schultz | 273/292 |
| 7,029,009 B2 | 4/2006 | Grauzer et al. | 273/149 P |
| 7,037,195 B2 | 5/2006 | Schneider et al. | 463/25 |
| 7,112,138 B2 | 9/2006 | Hedrick et al. | 463/29 |
| 7,156,735 B2 | 1/2007 | Brosnan et al. | 463/16 |
| 7,198,571 B2 | 4/2007 | LeMay et al. | 463/25 |
| 7,213,812 B2 | 5/2007 | Schubert et al. | 273/149 R |
| 7,291,068 B2 | 11/2007 | Bryant et al. | 463/25 |
| 7,309,065 B2 | 12/2007 | Yoseloff et al. | 273/292 |
| 7,311,598 B2 | 12/2007 | Kaminkow et al. | 463/16 |
| 7,311,605 B2 | 12/2007 | Moser | 463/25 |
| 7,316,615 B2 | 1/2008 | Soltys et al. | 463/25 |
| 7,329,185 B2 | 2/2008 | Conover et al. | 463/25 |
| 7,331,579 B2 | 2/2008 | Snow | 273/292 |
| 7,331,859 B2 | 2/2008 | Hornik et al. | 463/16 |
| 7,351,145 B1 | 4/2008 | Ornstein et al. | 463/25 |
| 7,364,510 B2 * | 4/2008 | Walker et al. | 463/42 |
| 7,404,763 B2 | 7/2008 | Malone et al. | 463/13 |
| 7,407,438 B2 | 8/2008 | Schubert et al. | 463/22 |
| 7,427,234 B2 | 9/2008 | Soltys et al. | 463/16 |
| 7,427,236 B2 | 9/2008 | Kaminkow et al. | 463/26 |
| 7,481,430 B1 | 1/2009 | Jackson et al. | 273/138.1 |
| 7,485,043 B2 | 2/2009 | Beaulieu et al. | 463/42 |
| 7,494,413 B2 | 2/2009 | Singer et al. | 463/20 |
| 7,534,169 B2 | 5/2009 | Amaitis et al. | 463/39 |
| 7,566,274 B2 | 7/2009 | Johnson et al. | 463/42 |
| 7,585,217 B2 | 9/2009 | Lutnick et al. | 463/16 |
| 7,607,976 B2 * | 10/2009 | Baerlocher et al. | 463/16 |
| 7,607,977 B2 * | 10/2009 | Baerlocher et al. | 463/16 |

(56) References Cited

U.S. PATENT DOCUMENTS

| | | | |
|---|---|---|---|
| 7,618,317 B2 | 11/2009 | Jackson | |
| 7,621,809 B2* | 11/2009 | Baerlocher et al. | 463/16 |
| 7,666,081 B2* | 2/2010 | Baerlocher et al. | 463/16 |
| 7,674,179 B2 | 3/2010 | Baerlocher et al. | |
| 7,684,874 B2* | 3/2010 | Schlottmann et al. | 700/9 |
| 7,684,882 B2* | 3/2010 | Baerlocher et al. | 700/92 |
| 7,689,302 B2* | 3/2010 | Schlottmann et al. | 700/91 |
| 7,730,198 B2 | 6/2010 | Ruppert et al. | 709/230 |
| 7,753,789 B2 | 7/2010 | Walker et al. | 463/42 |
| 7,775,868 B2 | 8/2010 | Toyoda | 463/12 |
| 7,780,526 B2 | 8/2010 | Nguyen et al. | 463/29 |
| 7,780,529 B2 | 8/2010 | Rowe et al. | |
| 7,787,972 B2* | 8/2010 | Schlottmann et al. | 700/91 |
| 7,819,745 B2 | 10/2010 | Cuddy et al. | |
| 7,854,654 B2* | 12/2010 | Baerlocher et al. | 463/27 |
| 7,862,425 B2 | 1/2011 | Cavagna | 463/25 |
| 7,867,081 B2 | 1/2011 | Schneider et al. | |
| 7,874,920 B2 | 1/2011 | Hornik et al. | 463/42 |
| 7,892,093 B2* | 2/2011 | Kniesteadt et al. | 463/25 |
| 7,901,294 B2 | 3/2011 | Walker et al. | 463/42 |
| 7,937,464 B2 | 5/2011 | Ruppert et al. | 709/224 |
| 7,963,847 B2* | 6/2011 | Baerlocher | 463/27 |
| 7,976,389 B2 | 7/2011 | Cannon et al. | |
| 7,993,199 B2 | 8/2011 | Iddings et al. | |
| 8,057,297 B2 | 11/2011 | Silvestro | |
| 8,070,583 B2* | 12/2011 | Baerlocher et al. | 463/16 |
| 8,075,396 B2* | 12/2011 | Roemer | 463/29 |
| 1,034,402 A1 | 7/2012 | Hardy | |
| 8,235,811 B2 | 8/2012 | Joshi et al. | |
| 8,241,111 B2 | 8/2012 | Manfredi et al. | |
| 8,267,773 B2* | 9/2012 | Jaffe et al. | 463/21 |
| 8,267,797 B2* | 9/2012 | Thomas et al. | 463/43 |
| 8,308,554 B2 | 11/2012 | Rowe et al. | |
| 2002/0063389 A1 | 5/2002 | Breeding et al. | |
| 2002/0084587 A1 | 7/2002 | Bennett et al. | 273/309 |
| 2002/0086725 A1 | 7/2002 | Fasbender et al. | 463/11 |
| 2002/0111210 A1 | 8/2002 | Luciano, Jr. et al. | 463/29 |
| 2002/0123376 A1 | 9/2002 | Walker et al. | 463/11 |
| 2002/0142825 A1 | 10/2002 | Lark et al. | 463/16 |
| 2002/0142844 A1 | 10/2002 | Kerr | |
| 2002/0142846 A1 | 10/2002 | Paulsen | 463/43 |
| 2002/0187825 A1 | 12/2002 | Tracy et al. | |
| 2002/0195773 A1 | 12/2002 | Dunn | 273/274 |
| 2002/0198044 A1 | 12/2002 | Walker et al. | 463/25 |
| 2003/0022714 A1 | 1/2003 | Oliver | 463/25 |
| 2003/0027625 A1 | 2/2003 | Rowe | 463/20 |
| 2003/0028480 A1 | 2/2003 | Rowe | 705/39 |
| 2003/0032474 A1 | 2/2003 | Kaminkow | 463/25 |
| 2003/0036425 A1 | 2/2003 | Kaminkow et al. | 463/25 |
| 2003/0042679 A1 | 3/2003 | Snow | 273/274 |
| 2003/0045354 A1 | 3/2003 | Giobbi | 463/40 |
| 2003/0064798 A1 | 4/2003 | Grauzer et al. | 463/29 |
| 2003/0075869 A1 | 4/2003 | Breeding et al. | 273/292 |
| 2003/0083126 A1 | 5/2003 | Paulsen | 463/25 |
| 2003/0104865 A1 | 6/2003 | Itkis et al. | 463/39 |
| 2003/0186733 A1 | 10/2003 | Wolf et al. | 463/16 |
| 2003/0186739 A1 | 10/2003 | Paulsen et al. | 463/25 |
| 2003/0195037 A1 | 10/2003 | Vuong et al. | 463/29 |
| 2003/0199320 A1 | 10/2003 | Nguyen et al. | 463/42 |
| 2003/0212597 A1 | 11/2003 | Ollins | 705/14 |
| 2003/0232640 A1 | 12/2003 | Walker et al. | 463/16 |
| 2003/0232651 A1 | 12/2003 | Huard | 463/42 |
| 2004/0002388 A1 | 1/2004 | Larsen et al. | 463/43 |
| 2004/0029635 A1 | 2/2004 | Giobbi | 463/30 |
| 2004/0043815 A1 | 3/2004 | Kaminkow | 463/25 |
| 2004/0090003 A1 | 5/2004 | Snow | 273/274 |
| 2004/0110557 A1 | 6/2004 | Rowe | 463/25 |
| 2004/0133485 A1 | 7/2004 | Schoonmaker et al. | 705/30 |
| 2004/0142743 A1 | 7/2004 | Oliver | 463/25 |
| 2004/0166918 A1 | 8/2004 | Walker et al. | 463/16 |
| 2004/0166940 A1 | 8/2004 | Rothschild | 463/42 |
| 2004/0219982 A1 | 11/2004 | Khoo et al. | 463/42 |
| 2004/0254010 A1 | 12/2004 | Fine | 463/25 |
| 2004/0259630 A1 | 12/2004 | Huard et al. | |
| 2005/0026680 A1 | 2/2005 | Gururajan | 463/25 |
| 2005/0043094 A1 | 2/2005 | Nguyen et al. | 463/42 |
| 2005/0051965 A1 | 3/2005 | Gururajan | 273/292 |
| 2005/0054438 A1 | 3/2005 | Rothschild et al. | 463/29 |
| 2005/0055113 A1 | 3/2005 | Gauselmann | 700/91 |
| 2005/0116020 A1 | 6/2005 | Smolucha et al. | 235/375 |
| 2005/0119052 A1 | 6/2005 | Russell et al. | 463/42 |
| 2005/0121852 A1 | 6/2005 | Soltys et al. | 273/149 P |
| 2005/0124411 A1 | 6/2005 | Schneider et al. | |
| 2005/0143166 A1 | 6/2005 | Walker et al. | 463/25 |
| 2005/0153778 A1 | 7/2005 | Nelson et al. | 463/42 |
| 2005/0181856 A1 | 8/2005 | Cannon et al. | 463/16 |
| 2005/0181864 A1 | 8/2005 | Britt et al. | 463/25 |
| 2005/0215311 A1 | 9/2005 | Hornik et al. | 463/20 |
| 2005/0221882 A1 | 10/2005 | Nguyen et al. | 463/16 |
| 2005/0239542 A1 | 10/2005 | Olsen | 463/27 |
| 2005/0255911 A1 | 11/2005 | Nguyen et al. | 463/25 |
| 2005/0255922 A1 | 11/2005 | Nguyen et al. | |
| 2005/0266919 A1 | 12/2005 | Rowe et al. | 463/25 |
| 2005/0282626 A1 | 12/2005 | Manfredi et al. | |
| 2005/0288083 A1 | 12/2005 | Downs, III | 463/11 |
| 2005/0288084 A1 | 12/2005 | Schubert | 463/11 |
| 2005/0288085 A1 | 12/2005 | Schubert et al. | 463/11 |
| 2006/0009282 A1 | 1/2006 | George et al. | 463/29 |
| 2006/0027971 A1 | 2/2006 | Radhakrishnan | 273/309 |
| 2006/0040732 A1* | 2/2006 | Baerlocher et al. | 463/25 |
| 2006/0046849 A1 | 3/2006 | Kovacs | 463/39 |
| 2006/0079317 A1 | 4/2006 | Flemming et al. | |
| 2006/0183541 A1 | 8/2006 | Okada et al. | 463/29 |
| 2006/0199649 A1 | 9/2006 | Soltys et al. | 463/47 |
| 2006/0205461 A1 | 9/2006 | LaRocca et al. | 463/1 |
| 2006/0205484 A1 | 9/2006 | Nicastro | |
| 2006/0247013 A1 | 11/2006 | Walker et al. | 463/20 |
| 2006/0281529 A1 | 12/2006 | Seelig et al. | 463/20 |
| 2006/0287077 A1 | 12/2006 | Grav et al. | 463/27 |
| 2007/0015583 A1 | 1/2007 | Tran | 463/40 |
| 2007/0057469 A1 | 3/2007 | Grauzer et al. | 273/309 |
| 2007/0060310 A1 | 3/2007 | Juds et al. | |
| 2007/0060365 A1 | 3/2007 | Tien et al. | 463/42 |
| 2007/0077990 A1 | 4/2007 | Cuddy et al. | 463/25 |
| 2007/0093298 A1 | 4/2007 | Brunet | 463/42 |
| 2007/0111794 A1 | 5/2007 | Hogan et al. | 463/42 |
| 2007/0117608 A1 | 5/2007 | Roper et al. | 463/16 |
| 2007/0167235 A1 | 7/2007 | Naicker | 463/42 |
| 2007/0191102 A1 | 8/2007 | Coliz et al. | 463/42 |
| 2007/0207850 A1 | 9/2007 | Darrah et al. | 463/20 |
| 2007/0243925 A1 | 10/2007 | LeMay et al. | 463/20 |
| 2007/0243927 A1 | 10/2007 | Soltys | 463/25 |
| 2007/0259709 A1 | 11/2007 | Kelly et al. | 463/20 |
| 2007/0259711 A1 | 11/2007 | Thomas | 463/22 |
| 2007/0293303 A1 | 12/2007 | Shayesteh | 463/25 |
| 2008/0026832 A1* | 1/2008 | Stevens et al. | 463/26 |
| 2008/0026848 A1* | 1/2008 | Byng | 463/42 |
| 2008/0045341 A1* | 2/2008 | Englman | 463/42 |
| 2008/0045344 A1 | 2/2008 | Schlottmann et al. | 463/25 |
| 2008/0064501 A1 | 3/2008 | Patel | 463/40 |
| 2008/0090651 A1 | 4/2008 | Baerlocher | 463/27 |
| 2008/0108433 A1 | 5/2008 | DiMichele et al. | 463/40 |
| 2008/0113704 A1 | 5/2008 | Jackson | 463/13 |
| 2008/0113764 A1 | 5/2008 | Soltys | 463/22 |
| 2008/0113781 A1 | 5/2008 | Soltys et al. | 463/28 |
| 2008/0261701 A1 | 10/2008 | Lewin et al. | 463/43 |
| 2008/0268946 A1* | 10/2008 | Roemer | 463/27 |
| 2008/0287185 A1 | 11/2008 | Yoseloff et al. | |
| 2008/0287197 A1 | 11/2008 | Ruppert et al. | 463/42 |
| 2009/0005176 A1 | 1/2009 | Morrow et al. | |
| 2009/0011833 A1 | 1/2009 | Seelig et al. | 463/42 |
| 2009/0029775 A1 | 1/2009 | Ruppert et al. | 463/42 |
| 2009/0075739 A1 | 3/2009 | Richardson | |
| 2009/0115133 A1 | 5/2009 | Kelly et al. | 273/274 |
| 2009/0117994 A1 | 5/2009 | Kelly et al. | 463/25 |
| 2009/0118001 A1 | 5/2009 | Kelly et al. | 463/29 |
| 2009/0118005 A1 | 5/2009 | Kelly et al. | |
| 2009/0118006 A1 | 5/2009 | Kelly et al. | 463/31 |
| 2009/0124362 A1 | 5/2009 | Cuddy et al. | |
| 2009/0176556 A1 | 7/2009 | Gagner et al. | 463/25 |
| 2009/0176558 A1 | 7/2009 | Englman et al. | |
| 2009/0176580 A1 | 7/2009 | Herrmann et al. | 463/43 |
| 2009/0239625 A1 | 9/2009 | Yoshizawa | |
| 2009/0253483 A1 | 10/2009 | Pacey et al. | 463/20 |

(56) References Cited

U.S. PATENT DOCUMENTS

| | | | |
|---|---|---|---|
| 2009/0270170 A1 | 10/2009 | Patton | 463/36 |
| 2009/0275374 A1 | 11/2009 | Nelson et al. | 463/16 |
| 2009/0275393 A1 | 11/2009 | Kisenwether et al. | 463/25 |
| 2009/0275395 A1 | 11/2009 | McAllister et al. | |
| 2009/0275398 A1 | 11/2009 | Nelson | 463/27 |
| 2009/0275399 A1 | 11/2009 | Kelly et al. | 463/27 |
| 2009/0275400 A1 | 11/2009 | Rehm et al. | 463/27 |
| 2009/0275407 A1 | 11/2009 | Singh et al. | 463/31 |
| 2009/0275410 A1 | 11/2009 | Kisenwether et al. | 463/42 |
| 2009/0275411 A1 | 11/2009 | Kisenwether et al. | 463/42 |
| 2009/0307069 A1 | 12/2009 | Meyerhofer | 705/14.12 |
| 2010/0048291 A1 | 2/2010 | Warkentin | 463/25 |
| 2010/0099480 A1 | 4/2010 | Caputo | |
| 2010/0130280 A1 | 5/2010 | Arezina et al. | 463/20 |
| 2010/0137056 A1* | 6/2010 | Hoffman et al. | 463/21 |
| 2010/0151926 A1 | 6/2010 | Ruppert et al. | 463/1 |
| 2010/0161798 A1 | 6/2010 | Ruppert et al. | 709/225 |
| 2011/0009184 A1* | 1/2011 | Byng | 463/20 |
| 2011/0111826 A1* | 5/2011 | Baerlocher et al. | 463/20 |
| 2011/0269534 A1 | 11/2011 | Kelly et al. | |

FOREIGN PATENT DOCUMENTS

| | | |
|---|---|---|
| KR | 2001-0084838 | 9/2001 |
| KR | 2002-0061793 | 7/2002 |
| KR | 2003-0091635 | 12/2003 |
| WO | 96/36253 A1 | 11/1996 |
| WO | 97/36658 A1 | 10/1997 |
| WO | 00/22585 A2 | 4/2000 |
| WO | 03/060846 A2 | 7/2003 |
| WO | 2005/035084 A1 | 4/2005 |

OTHER PUBLICATIONS

Bally TMS, "MP21—Automated Table Tracking/Features," 2 pages, Nov. 2005.

Bally TMS, "MPLite—Table Management System/Features," 2 pages, Nov. 2005.

Bravo Gaming Systems, "Casino Table Wager Analysis and Player Tracking System—Table Operations/Unique Features," accessed Apr. 11, 2005, URL = http://www.genesisgaming.com, 4 pages.

Bulaysky, J., "Tracking the Tables," Casino Journal, May 2004, pp. 44-47, accessed Dec. 21, 2005, URL = http://www.ascendgaming.com/cj/vendors_manufacturers_table/Trackin916200411141AM.htm, 5 pages.

Burke, A., "Tracking the Tables," reprinted from International Gaming & Wagering Business, Aug. 2003, 4 pages.

Casino Software & Services, LLC., accessed Aug. 25, 2006, URL = http:/casinosoftware.com/home.html, 6 pages.

Gros, R., "All You Ever Wanted to Know About Table Games," reprinted from Global Gaming Business, Aug. 1, 2003, 2 pages.

Hewlett Packard Handhelds, accessed Sep. 8, 2003, URL = http:/www.shopping.hp.com/cgi-bin/hpdirect/shopping/scripts/home/store_access.jsp?temp . . . , 2 pages.

International Guild of Hospitality & Restaurant Managers, "Shuffle Master, Inc. (NasdaqNM:SHFL)," accessed Dec. 30, 2003, URL = http://hospitalityguide.com/Financial/Casinos/Shuffle.htm, 3 pages.

Linksys WAP11 "Wireless Network Access Point," accessed Sep. 8, 2003, URL = http:/www.linksys.com/products/product.asp?prid=157&grid=, 4 pages.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Mikohn, "Tablelink™, The New Standard in Table Games," before Jan. 1, 2004, 14 pages.

Pro, L.V., "Book Review—The Card Counter's Guide to Casino Surveillance," Blackjack Insider Newsletter, May 2003, #40, accessed Aug. 25, 2006, URL =http:/bjinsider.com/newsletter 40 surveillance.shtml, 5 pages.

Semtek PDA & Handheld Devices, Compaq iSwipe™ Magnetic Card Reader, accessed Sep. 8, 2003, URL = http:/www.semtek.com/products/iswipe.html, 3 pages.

Shuffle Master, Inc., "Shuffle Master Announces New Products; Intelligent Table System to Be Debuted at G2E," Sep. 10, 2003, 2 pages.

Shuffle Master, Inc., "Shuffle Master Gaming Presents the Ultimate Player Rating System . . . Bloodhound Sniffs Out the Pros and Cons," Dec. 31, 1997, 6 pages.

Snyder, A., "The High-Tech Eye," excerpt from Blackjack Forum, Spring 1997, accessed Dec. 21, 2005, from Casino Software & Services, LLC, URL = http://www.casinosoftware.com/bj forum.html.

Terdiman, D., "Who's Holding the Aces Now?", reprinted from Wired News, Aug. 18, 2003, 2 pages.

Ward, K., "BJ Tracking System has Players Down for the Count," Gaming Today, Mar. 5, 2002, accessed Dec. 21, 2005, from Casino Software & Services, LLC, URL = http://www.casinosoftware.com/gaming today.html.

Winkler, C., "Product Spotlight: MindPlay," reprinted from Gaming and Leisure Technology, Fall 2003, 2 pages.

International Search Report for PCT/US2009/041971, mailed Dec. 4, 2009, 3 pages.

Written Opinion for PCT/US2009/041971, mailed Dec. 4, 2009, 4 pages.

Examination Report under Section 18(3) for corresponding UK Patent Application No. GB1019306.8, dated Jan. 14, 2013, 3 pages.

Joseph Kisenwether et al., "Coordinating Group Play Events for Multiple Game Devices," Office Action dated May 2, 2011, for U.S. Appl. No. 12/112,389, 31 pages.

Joseph Kisenwether et al., "Coordinating Group Play Events Game Devices," Amendment dated Jun. 30, 2011, for U.S. Appl. No. 12/112,389, 17 pages.

Joseph Kisenwether et al., "Coordinating Group Play Events for Multiple Game Devices," Office Action dated Sep. 23, 2011, for U.S. Appl. No. 12/112,389, 23 pages.

International Search Report, mailed Dec. 4, 2009, for PCT/US2009/041997, 3 pages.

Written Opinion, mailed Dec. 4, 2009, for PCT/US2009/041997, 4 pages.

Written Opinion and Search Report for Corresponding Singapore Patent Application No. 201105777-5, mailed Nov. 2, 2012, 12 pages.

* cited by examiner

FACILITATING GROUP PLAY WITH MULTIPLE GAME DEVICES

BACKGROUND

1. Technical Field

The following description relates generally to the field of game devices, and more particularly to facilitating group play between multiple networked game devices.

2. Description of the Related Art

Traditionally, gaming properties have devoted a large percentage of floor space to game devices. Each game device presents players with individual games of chance, games of skill, or combinations thereof on which a player may wager. Some game devices present a player of the game device with games that include group play bonus games. Group play bonus games are triggered, from time to time, while a player of a game device is playing a primary game provided by the game device. When a group play bonus game is triggered, a player of the game device that triggered the bonus game participates in a common game or event with one or more other players playing at other game devices.

Although such game devices have achieved a certain level of popularity, it would be desirable to provide improved group play functionality.

BRIEF SUMMARY

In one embodiment, a computer-implemented method to provide group play with multiple game devices is described, the method comprising: for each of a plurality of game devices, obtaining eligibility information indicative of at least one characteristic related to a user of the game device; based at least in part on the obtained eligibility information, determining which of at least some of the plurality of game devices qualify to participate in a group play event before the group play event is triggered; based at least in part on a total number of game devices determined to qualify to participate in a group play event, determining an adjustment to a value that is indicative of a probability of an occurrence of a group play event, where the adjustment to the value accommodates a variation over time in the total number of game devices that are determined to qualify to participate in the group play event; and causing an adjustment of at least one group play event generator based on the determined adjustment to the value.

In another embodiment, a computer-readable medium is described, whose contents enable a computing device to provide group play with multiple game devices, by: for each of a plurality of game devices, obtaining eligibility information indicative of at least one characteristic related to a user of the game device; based at least in part on the obtained eligibility information, determining which of at least some of the plurality of game devices qualify to participate in a group play event before the group play event is triggered; based at least in part on a total number of game devices determined to qualify to participate in a group play event, determining an adjustment to a value that is indicative of a probability of an occurrence of a group play event, where the adjustment to the value accommodates a variation over time in the total number of game devices that are determined to qualify to participate in the group play event; and causing an adjustment of at least one group play event generator based on the determined adjustment to the value.

In yet another embodiment, a computing system configured to provide group play with multiple game devices comprises: a memory; and a component that is configured to provide group play with multiple game devices, by: for each of a plurality of game devices, obtaining eligibility information indicative of at least one characteristic related to a user of the game device; based at least in part on the obtained eligibility information, determining which of at least some of the plurality of game devices qualify to participate in a group play event before the group play event is triggered; based at least in part on a total number of game devices determined to qualify to participate in a group play event, determining an adjustment to a value that is indicative of a probability of an occurrence of a group play event, where the adjustment to the value accommodates a variation over time in the total number of game devices that are determined to qualify to participate in the group play event; and causing an adjustment of at least one group play event generator based on the determined adjustment to the value.

In still another embodiment, a computer-implemented method to provide group play between multiple game devices that provide interfaces for users to play primary games, bonus games and group play is described, the method comprising: for each of a plurality of game devices, obtaining eligibility information indicative of at least one characteristic related to a user of the game device; based at least in part on the obtained eligibility information, determining which of at least some of the plurality of game devices qualify to participate in a group play event before the group play event is triggered; and for each of at least some of the game devices determined to qualify, initiating the group play event based at least in part on an outcome of a bonus game occurring.

In another embodiment, a computer-readable medium is described, whose contents enable a computing device to provide group play between multiple game devices that provide interfaces for users to play primary games, bonus games and group play, by: for each of a plurality of game devices, obtaining eligibility information indicative of at least one characteristic related to a user of the game device; based at least in part on the obtained eligibility information, determining which of at least some of the plurality of game devices qualify to participate in a group play event before the group play event is triggered; and for each of at least some of the game devices determined to qualify, initiating the group play event based at least in part on an outcome of a bonus game occurring.

In yet another embodiment, a computer system configured to provide group play between multiple game devices that provide interfaces for users to play primary games, bonus games and group play comprises: a memory; and a component that is configured to provide group play between multiple game devices, by: for each of a plurality of game devices, obtaining eligibility information indicative of at least one characteristic related to a user of the game device; based at least in part on the obtained eligibility information, determining which of at least some of the plurality of game devices qualify to participate in a group play event before the group play event is triggered; and for each of at least some of the game devices determined to qualify, initiating the group play event based at least in part on an outcome of a bonus game occurring.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Fur

DETAILED DESCRIPTION

Figure 1:
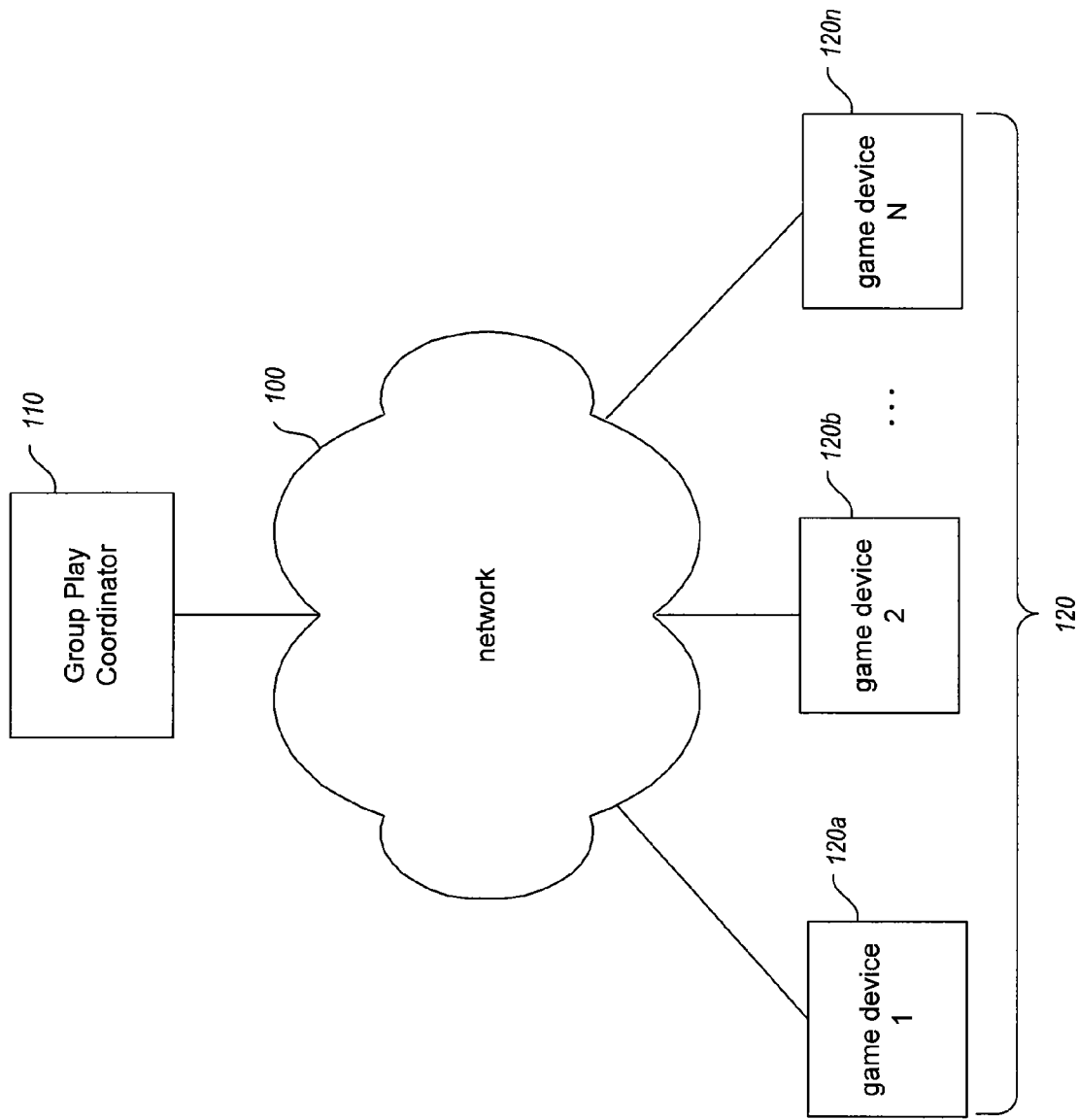
- FIG. 1 is a is a network diagram illustrating an example embodiment in which game devices and a Group Play Coordinator interact via a network.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with game devices, networks, integrated circuits, and computing devices have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

Techniques are described for, among other things, providing group play events with multiple networked game devices, each of such group play events involving participation of one or more game devices that qualify to participate in the group play event. In some embodiments, such group play events may be initiated by any of one or more game devices that qualify to participate in the group play events, such that when any one of the one or more qualifying game devices initiates a group play event, all of the one or more qualifying game devices participate or are invited to participate in the group play event. In particular, in at least some embodiments, the described techniques include automatically adjusting a likelihood at which a group play event may be initiated by each of the one or more qualifying game devices, such as to accommodate for a dynamically changing number of game devices that qualify to participate in a group play event at any given time. For example, a group play event may be initiated as a result of a probabilistic triggering event generated by any of one or more game devices that qualify to participate in the group play event, and in some embodiments, a probability of the triggering event being generated on any of the one or more qualified game devices may be adjusted such that an overall probability of the one or more qualified game devices participating in the group play event remains relatively consistent regardless of how many game devices qualify to participate in the group play.

In addition, in at least some embodiments, the described techniques include automatically initiating a group play event as a result of an occurrence of one or more outcomes of a bonus game presented to a player of at least one of a plurality of game devices qualified to participate in the group play event. For example, in some embodiments, each of a plurality of game devices may provide to a player of the game device one or more primary games, one or more bonus games, and one or more games that include group play events. In such embodiments, one or more of various events may trigger a bonus game to occur for a player of a game device, such as while the player is interacting with a primary game provided by the game device. Furthermore, in such embodiments, at least some of the bonus games include intermediate bonus games that may trigger group play events based upon the occurrence of one or more potential outcomes of the at least some intermediate bonus games. Additionally, in some further embodiments, a likelihood that such outcomes may be generated may be adjusted to accommodate for a dynamically changing number of game devices that qualify to participate in group play events at any given time, such as at a time when an intermediate bonus game is triggered by one of the qualifying game devices.

FIG. 1 shows an example embodiment in which a plurality of game devices and a Group Play Coordinator are interacting over a network, with an illustrated embodiment of the Group Play Coordinator provided to coordinate group play events with multiple of the plurality of game devices. In particular, the illustrated example includes a number of example game devices 120*a*-120*n* (collectively 120) that may each be interacting with each other and/or with a Group Play Coordinator 110 via a network 100. The network 100 may be, for example, a local area network (LAN) or a wide area network (WAN). In some embodiments, the network 100 may be, for example, a private network, such as a corporate network, a university network, or a casino gaming network that is wholly or partially inaccessible to unprivileged devices or users. In other embodiments, the network 100 may be a publically accessible network of linked networks, such as the Internet. In still other embodiments, the game devices 120 may be communicatively coupled to the Group Play Coordinator 110 by any means known in the art for data communication.

Each of the game devices 120 may function as a user interface to provide one or more games to a player (not shown) of the game device, including, for example, primary games, bonus games, and games that include group play features. In some embodiments, the primary games provided by each of the game devices 120 may include one or more games of chance, such as, for example, mechanical or video reel-spinning games, video keno, video poker, mechanical or video roulette, bingo, lottery, craps, blackjack, mechanical or video wheel games, etc. In other embodiments, the primary games provided by the game devices may include games of skill or games of chance involving at least some amount of player skill. In some embodiments, one or more outcomes of the one or more games provided by a game device may be randomly generated, such as based in part on a random number generator. The primary game may be usefully identified as the game that the player has initially selected to play or on which the player has placed a primary wager.

Each of the game devices 120 may also provide one or more awards to a corresponding player of the game device, such as, for example, free plays, extended plays, extra lives, bonus rounds, prizes, coupons, payouts (e.g., credit, currency, vouchers, etc.), etc., and such awards may be awarded as a potential outcome of playing a primary game, a bonus game, or a group play event. In some embodiments, the game devices 120 may each accept wagers from a player of the game device such that the player may wager on one or more potential outcomes of presented games and potentially win an award based on the outcome (e.g., a slot machine, etc.).

As previously noted, game devices 120 may each also provide one or more bonus games to a player of the game device. Bonus games may be similar to any one of the primary games, or may be a different game. In addition, bonus games may include games executed solely for the participation of a player interacting with the primary game of a game device. For example, a bonus game may include an interactive game to be played by the player of the game device, such as a bonus level of a primary game; an automatic award for the player of the game device; a presentation of a bonus sequence (e.g., video, audio, etc.) for the player of the game device; etc. In addition, in some embodiments, bonus games may include one or more group play features that include multiple game devices, such as, for example, competitive or cooperative games involving players of multiple game devices; automatic awards provided to players of multiple game devices (e.g., such as at a coordinated time); a presentation of a bonus sequence for players of multiple game devices; etc.

Bonus games may be presented to players of game devices in various ways in various embodiments. For example, in some embodiments, a bonus game may be presented to a player of a game device on the game device, such that the player interacts with the game device to participate in the bonus game. In other embodiments, a bonus game may be presented to a player of a game device on one or more other devices other than the game device.

A bonus game may be initiated based on an occurrence of one or more triggering events in various embodiments. For example, a bonus game may be triggered by an occurrence of one or more outcomes of a primary game (e.g., a resulting combination of symbols on a payline of a reel game, etc.); a random event independent of an outcome of a primary game (e.g., based on a value generated by a random number generator, etc); an amount of time a player has played one or more game devices; a number of games played by a player; a point total achieved by a player (e.g., score); a level achieved by a player; an expiration of a timer; one or more events occurring external to a game device (e.g., triggered by a network controller, etc.); an amount wagered by a player; a cumulative amount wagered by a player of a game device and/or one or more other players of one or more other game devices; etc.

In various embodiments, various aspects related to triggering events for bonus games may be configurable, such as aspects related to how often a triggering event occurs for a game device, etc. For example, a provider of a game device (e.g., a casino operator, a device manufacturer, etc.) may set a configurable value used by a game device to generate a bonus game triggering event (e.g., a timer value, a probability value, a target score value, a value for a random number generator, etc.). In addition, in some embodiments, at least some aspects of triggering events may be configurable by a player of a game device, such as via a configuration user interface provided by the game device prior to and/or during game play.

In some embodiments, aspects related to bonus game triggering events may be automatically configured based at least in part on one or more dynamic factors. For example, a likelihood that a bonus game triggering event is to occur may be adjusted on the basis of factors related to one or more players of one or more game devices, such as player activity at the one or more game devices, a number of players playing one or more game devices, status associated with one or more of the one or more players, etc. In some embodiments, aspects related to bonus game triggering events may be automatically configured by a game device based on one or more dynamic factors. In some embodiments, a Group Play Coordinator 110 may automatically interact with one or more game devices to configure bonus game triggering events based on dynamic factors.

As previously noted, the game devices 120 may each provide games that include one or more group play features, involving participation of one or more other game devices in a group play event. For example, multiple game devices, such as networked game devices 120, may be associated into one or more groups (e.g., logical and/or physical groups), such that each group consists of multiple game devices configured to participate, from time to time, in one or more group play events with one or more other game devices in the group. In some embodiments, each of the multiple game devices in a group may only participate in a group play event if the game device is eligible to do so at the time the group play event is initiated, such as based on one or more eligibility factors or criteria (discussed below).

Group play events may generally include multiple game devices participating in a common event in a coordinated manner. For example, group play events may include games, such as bonus games, that are provided to players of multiple game devices in a simultaneous or near simultaneous manner based upon a common triggering event. In some embodiments, a group play event may include an interactive game provided to each of one or more respective players of multiple game devices, such that one or more outcomes of the group play event may be determined based upon one or more interactions of the one or more respective players during the interactive game. In some embodiments, such interactive games may include, for example, competitive games, cooperative games, head-to-head games, etc. Furthermore, in some embodiments, group play events may not provide interactive games for players of multiple game devices, but may instead provide automatic events for multiple game devices, such as, for example, an automatic award provided to a respective player of each of multiple game devices upon the occurrence of the group play event (e.g., a game device triggering a group jackpot).

Group play events may be initiated for multiple game devices based on the occurrence of one or more triggering events. For example, in various embodiments, a group play event may be triggered based on an occurrence of one or more outcomes of a primary game of one or more of the multiple game devices (e.g., a resulting combination of symbols on a payline of a reel game, etc.); an occurrence of one or more outcomes of a bonus game of one or more of the multiple game devices; a random event independent of an outcome of a primary or bonus game; an amount of time one or more players have played one or more of the multiple game devices; a number of games played by one or more players of one or more of the multiple game devices; a number of the multiple game devices being played by one or more players; a point total (e.g., score) or level achieved by one or more players of one or more of the multiple game devices; an expiration of one or more timers; one or more events triggered by a device or computing system other than the multiple game devices (e.g., triggered by a network controller, etc.); an amount wagered by one or more players of one or more of the multiple game devices; a cumulative amount wagered by one or more players of one or more of the multiple game devices; etc.

In at least some of the embodiments described below, a bonus game that has a potential outcome that may trigger a group play event may be generally referred to as an "intermediate bonus game." In various embodiments, one or more aspects of triggering events for a group play event may be configurable in various ways similar to those described above with respect to bonus games.

In one embodiment, each of game devices 120 may participate in a group play event only if the game device qualifies to participate in the group play event at the time of the event, such as, for example, based on one or more eligibility factors (discussed below). A group play event may be initiated by an occurrence of a triggering event by any of one or more game devices that qualify to participate in the group play event. In such cases, when any one of the one or more game devices that qualify to participate in a group play event triggers a group play event, the group play event is initiated for all the game devices that qualify. A number of game devices that qualify to participate in a group play event at any given time may change over time based in part on the one or more eligibility factors at that given time.

In some embodiments, a likelihood of any one of one or more game devices that qualify to participate in a group play event triggering a group play event may be dynamically adjusted based at least in part on a total number of game devices that qualify to participate in the group play event at any given time. For example, in some embodiments, the likelihood of any one game device triggering a group play event may be increased or decreased based at least in part on how many game devices qualify to participate in a group play event at any given time. This may be done, for example, to maintain a consistent likelihood of a group play event being initiated for all qualifying game devices at any given time, regardless of how may game devices qualify to a participate in the group play event, and thus qualify to trigger the group play event, at any given time.

As one illustrative example embodiment, a game device from a group of game devices may provide an intermediate bonus game that includes a spinning wheel game with one outcome of the wheel game indicating a group play feature, such that if the spinning wheel lands on the one outcome, a group play event is triggered for a number of game devices that qualify to participate in the group play event from the group of game devices. A probability of the spinning wheel landing on the one outcome that triggers a group play event may be adjusted based in part on the number of game devices that qualify to participate. For example, the intermediate bonus game may be configured to have a one in thirty chance (e.g., a probability of 1/30) of occurring for each qualified game device, and the group play event may be configured such that any qualified game device has a target probability of one in sixty (e.g., a probability of 1/60) of participating in a group play event. The probability of an intermediate bonus game landing on the one outcome (and, thus, triggering the group play event) may be adjusted such that the target probability remains approximately consistent regardless of how many game devices qualify to participate in the group play event. For example, if one game device qualifies to participate in a group play event, then the probability of the wheel landing on the one outcome may be set to a one in two chance (e.g., a probability of ½), such that a player of the one qualified game device has a one in thirty chance of participating in the intermediate bonus game and a one in two chance of triggering a group play event based on the outcome of the intermediate bonus game; if two game devices qualify to participate, then the probability of the wheel landing on the one outcome may be set to one and four (e.g., a probability of ¼), such that a player of either of the two game devices each has a one in thirty chance of participating in the intermediate bonus game and a one in four chance of triggering a group play event based on the outcome of the intermediate bonus game; etc. The following table illustrates this example for up to eight qualified game devices:

| Probability of intermediate bonus game occurring for a game device | Number of game devices qualifying to participate in group play event | Probability of intermediate bonus game triggering group play event | Target probability for group play event to occur for qualifying game devices |
| --- | --- | --- | --- |
| 1/30 | 1 | 1/2 | 1/60 |
| 1/30 | 2 | 1/4 | 1/60 |
| 1/30 | 3 | 1/6 | 1/60 |
| 1/30 | 4 | 1/8 | 1/60 |
| 1/30 | 5 | 1/10 | 1/60 |
| 1/30 | 6 | 1/12 | 1/60 |
| 1/30 | 7 | 1/14 | 1/60 |
| 1/30 | 8 | 1/16 | 1/60 |

Thus, in such an example, the probability of the group play event being triggered by any of a number of qualifying game devices approximates the target probability of one in sixty, regardless of the number of qualifying game devices.

It will be appreciated that the preceding illustrative example embodiment is just one of many potential embodiments, and the described techniques may be applied in various other embodiments in various other ways. For example, in some embodiments, a likelihood of any one of one or more game devices that qualify to participate in a group play event triggering a group play event may be dynamically adjusted based on one or more of various formulas, or may be selected from a stored table consisting of predetermined values, etc. In other embodiments, the likelihood may be adjusted for other purposes, other than maintaining a single target probability, such as, for example, the likelihood may be adjusted to maintain a range of target probabilities, etc. In addition, in some embodiments, a likelihood of any one of one or more game devices that qualify to participate in a group play event triggering a group play event may be dynamically adjusted based on other factors in addition to or instead of a number of game devices that qualify to participate in the group play event at any given time, such as, for example based on factors similar to those described with respect to bonus games (e.g., player activity, player status, wager levels, etc.). In addition, a likelihood may be adjusted based of a combination of eligibility scores (discussed in more detail below) maintained by one or more game devices, such that a group play event may be made more likely to occur when a combination of eligibility scores is relatively high and less likely to occur when a combination of eligibility scores is low. Eligibility scores can reflect a variety of parameters, for example, a rate of wagering, an amount wagered, or a value indicative of a worth of a customer to the facility.

In some embodiments, one or more aspects governing performance of a group play event for each of one or more game devices participating in the group play event may be configured prior to execution of the group play event for the one or more participating game devices. For example, such aspects governing performance may be related to a type of award to provide to a respective player of each of the participating game devices; an amount to award a respective player of each of the participating game devices; a source from which to award a respective player of each of the participating game devices; a paytable identifier; a number of free games to provide to a respective player; a number of choices that a respective player may select; etc.

At some time after a group play event has been initiated for multiple game devices, a group play event may be terminated upon the occurrence of one or more events in various embodiments. For example, a group play event may terminate upon completion of a game objective or an occurrence of an outcome by any or all participating game devices; after a predetermined number of turns by participants of the group play event; upon the expiration of one or more timers; or by any other event indicating that a group play event is to be terminated. In some embodiments, group play events may be terminated by any of one or more of the participating game devices, or by another device or computing system, such as by a device or computing system executing an embodiment of the Group Play Coordinator.

Each of the game devices 120 may maintain an eligibility score indicative of whether the game device is eligible to participate in a group play event on behalf of a respective player of the game device. In other embodiments, eligibility information for each of game devices 120 may be maintained remotely from the game devices, such as for example, by an embodiment of the Group Play Coordinator 110. Whether a game device is eligible to participate in a group play event may be based on one or more of the following factors: an amount of time a player has played a game device; a rate at which a player is playing the game device; an amount of time that has passed since a player last participated in a group play event; a status related to a player of the game device (e.g., player club status, etc.); a level obtained by the player of the game device; a score achieved by a player of the game device; an amount a player has wagered; an amount a player has been awarded; an outcome of a game provided by the game device; a state of the game device (e.g., tilt; money on a credit meter; etc.); a relative success rate of the player; etc.

As one illustrative example embodiment, an eligibility score may be a measurement of a rate at which a player has been wagering at a game device, such as, for example, at a slot machine with a spinning game. In such an embodiment, an eligibility score may be determined as follows:

The eligibility score (ES) is set to zero when:
(1) the credit meter of the slot machine drops to zero;
(2) the player is currently participating in a group play event; or
(3) a time limit has been exceeded since the player last wagered.

At the time that the player makes a wager on the game device, the eligibility score is calculated using the formula:

$$\frac{B + ES' \cdot (L - t)}{L}$$

Where:
B=the amount of the wager
ES'=the previous eligibility score
L=a predetermined window of time (e.g., the length of an average spin plus a grace period)
t=the amount of time since the player last wagered (e.g., the time since the end of the last spin)

In other embodiments, an eligibility score may representative of other aspects of a player of a game device, and/or may be determined using other methods. In some embodiments, an eligibility score may be a Boolean value that indicates whether a game device being played by the player is eligible or not.

As previously noted, in some embodiments, each of the game devices 120 may accept wagers from a player of the game device and provide potential awards to the player on the basis of one or more outcomes of a game provided by the game device to the player. For example, a game device may provide a game of chance to a player, such as, for example, mechanical or video reel-spinning games, video keno, video poker, mechanical or video roulette, bingo, lottery, craps, blackjack, mechanical or video wheel games, etc. In some such embodiments, each of the game devices 120 may contribute a percentage of a wager made by a player of the game device to one or more progressive pools of funds (e.g., a progressive jackpot), from which one or more players of one or more game devices may be awarded. In some embodiments, at least some of the game devices 120 may each maintain one or more progressive pools. In other embodiments, one or more progressive pools may be maintained by an embodiment of the Group Play Coordinator 110 or some other device or computing system connected to network 100, in addition to or instead of the game devices 120.

The eligibility score related to a game device may be used in some embodiments to determine an award to provide to a player of a game device as a potential result of participating in a group play event. In particular, in some embodiments, an eligibility score may be used to determine an apportionment from one or more progressive pools to award each player of a respective game device participating in the group play event. For example, an eligibility score may be used to determine a proportional share of one or more progressive pools. In another embodiment, an eligibility score may determine which of one or more paytables to use to award a player of a game device.

As one illustrative example embodiment, the following method may be used to determine which of several paytables each game device should use to award a player of the game device, such that the determination of which paytable to use is approximately proportional to each player's respective eligibility score: (1) take the integer portion of a specified bonus pool amount (leaving any fractional portion to seed the next pool); (2) assign 1 point to each of a number of eligible game devices and subtract the assigned number of points from the integer portion; and (3) while there are still points remaining in the integer portion: (a) divide each eligible game device's eligibility score by the total number of points assigned to that game device, (b) assign 1 point to the eligible game device that has the highest remaining eligibility score, (c) subtract 1 point from the remaining integer portion. Each game device may use its respective assigned point total to index a paytable, which in turn may be used to award a respective player of the game device. It will be appreciated that this example embodiment was provided for illustrative purposes, and other methods may be used in other embodiments.

In some embodiments, the Group Play Coordinator 110 performs at least some of the described techniques in order to facilitate group play with the game devices 120. For example, as described in greater detail with respect to FIGS. 2A and 2B, one or more of the game devices 120 may interact with the Group Play Coordinator to initiate a group play event with one or more of the other game devices 120. For example, an event that triggers a group play event may be generated by any of one or more of multiple game devices 120, and in such cases, when a game device generates such a triggering event, the game device may notify the Group Play Coordinator of the occurrence of the triggering event. The Group Play Coordinator may then notify one or more game devices from the multiple game devices that a group play event has been triggered, such that the one or more game devices may participate in the group play event. In addition, the Group Play Coordinator may determine which of multiple game devices 120 qualify to participate in a group play event (e.g., such as based upon eligibility scores of the devices). In some embodiments, the Group Play Coordinator may provide parameters to each of the game devices governing one or more aspects of the performance of the group play event for each of the game devices, including, for example, parameters related award types, award amounts, award sources, paytable identifiers, selectable choices, number of game devices participating in the group play event, etc.

The Group Play Coordinator 110 may interact with one or more game devices to adjust a likelihood of the one or more game devices triggering a group play event. For example, as described in more detail elsewhere, the Group Play Coordinator may determine an adjusted probability value based on a number of game devices that qualify to participate in a group play event, and may provide the value to one or more game devices for use in triggering a group play event. In some embodiments, the Group Play Coordinator may configure other aspects of group play events as well as configure aspects related to bonus game triggering events.

In one embodiment, the Group Play Coordinator 110 may determine an apportionment of an award for a player of a game device that qualifies to participate in a group play event, such as based upon respective eligibility scores of one or more game devices (e.g., using techniques described elsewhere, etc.). In some embodiments, the Group Play Coordinator 110 may maintain one or more progressive pools from which to award respective players of one or more game devices.

In some embodiments, multiple game devices participating in a group play event may each provide information related to the group play event to one or more other game devices participating in the group play event, or to one or more other devices or computing systems, such as an embodiment of the Group Play Coordinator. For example, each of one or more game devices participating in a group play event may report intermediate or final results of the group play event to the illustrated Group Play Coordinator 110. The Group Play Coordinator may in turn provide the results received from one or more game devices participating in a group play event to each of the other game devices participating in the group play event, such that each game device may display to a player of the game device information on how other players are performing in the group play event. In addition, in some embodiments, the Group Play Coordinator may display the results of the group play event on one or more overhead displays, such as those visible to nonparticipants, etc. In some embodiments, the Group Play Coordinator may also obtain intermediate and final result information from each of the one or more game devices that participated in a group play event to determine an overall outcome of the group play event, for example, such as to determine an amount to award each participant.

Although FIG. 1 presents game devices 120 as separate game devices, it will be appreciated that game devices 120 may be physically located together, such as in a common housing or a bank of game devices, or may each be spread across a common geographical location. In other embodiments, game devices may be located in different geographical locations, such as, for example, in different buildings, properties, etc. In addition, although some embodiments have been described in which game devices each provide games for a single player of the game device, in other embodiments one or more of the game devices may each provide games to one or more players. Furthermore, although the illustrated embodiment of the Group Play Coordinator has been described in various embodiments as a separate device or computing system from the one or more game devices, in some embodiments, an embodiment of the Group Play Coordinator may instead be included on one or more game devices.

For illustrative purposes, some embodiments are described below in which specific types of devices interact in specific manners. These examples are provided for illustrative purposes and are simplified for the sake of brevity, and it will be appreciated that the inventive techniques may be used in a wide variety of other situations, some of which are described below.

Figure 2A:
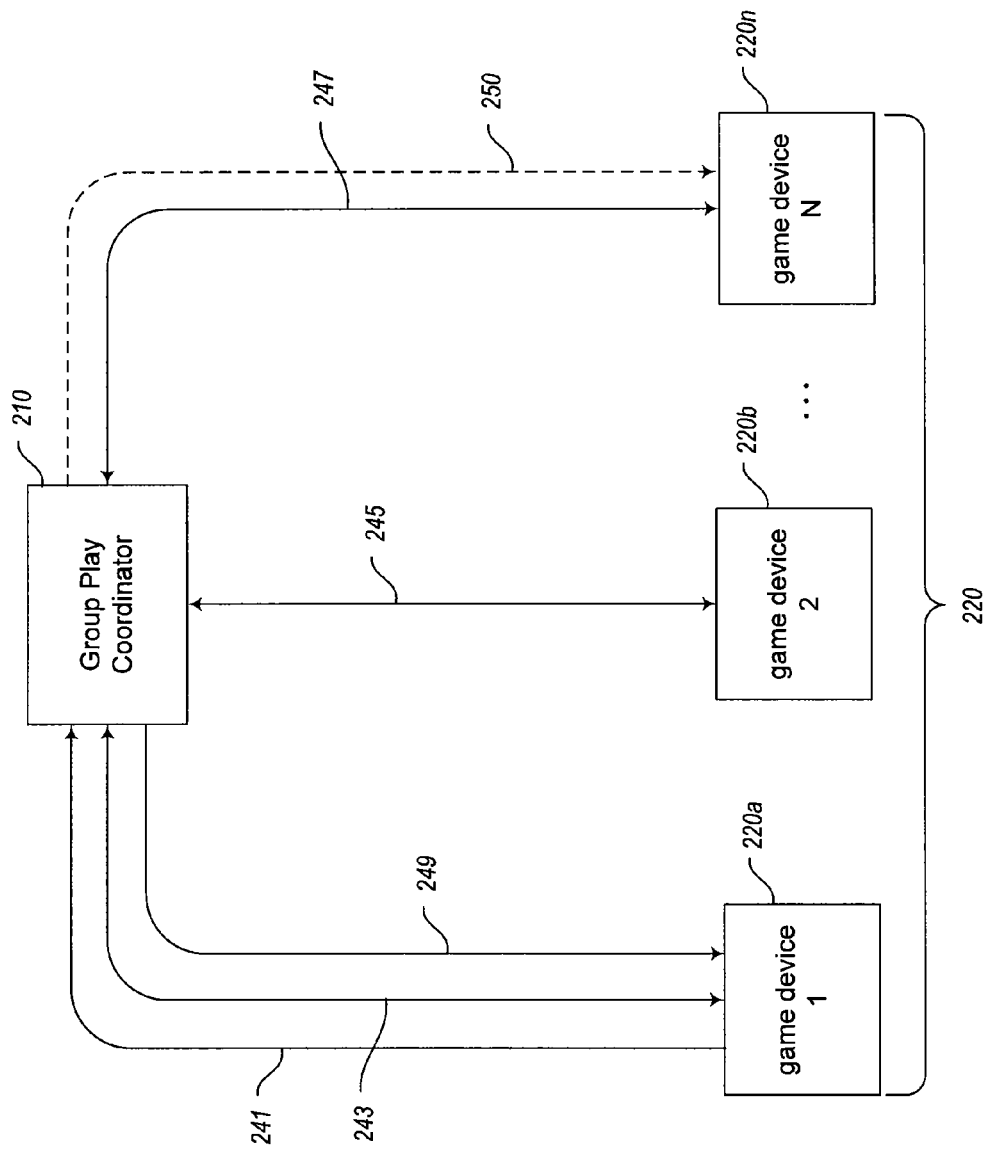
FIGS. 2A and 2B are schematic diagrams that illustrate examples of interactions for providing group play with multiple devices.
Figure 2B:
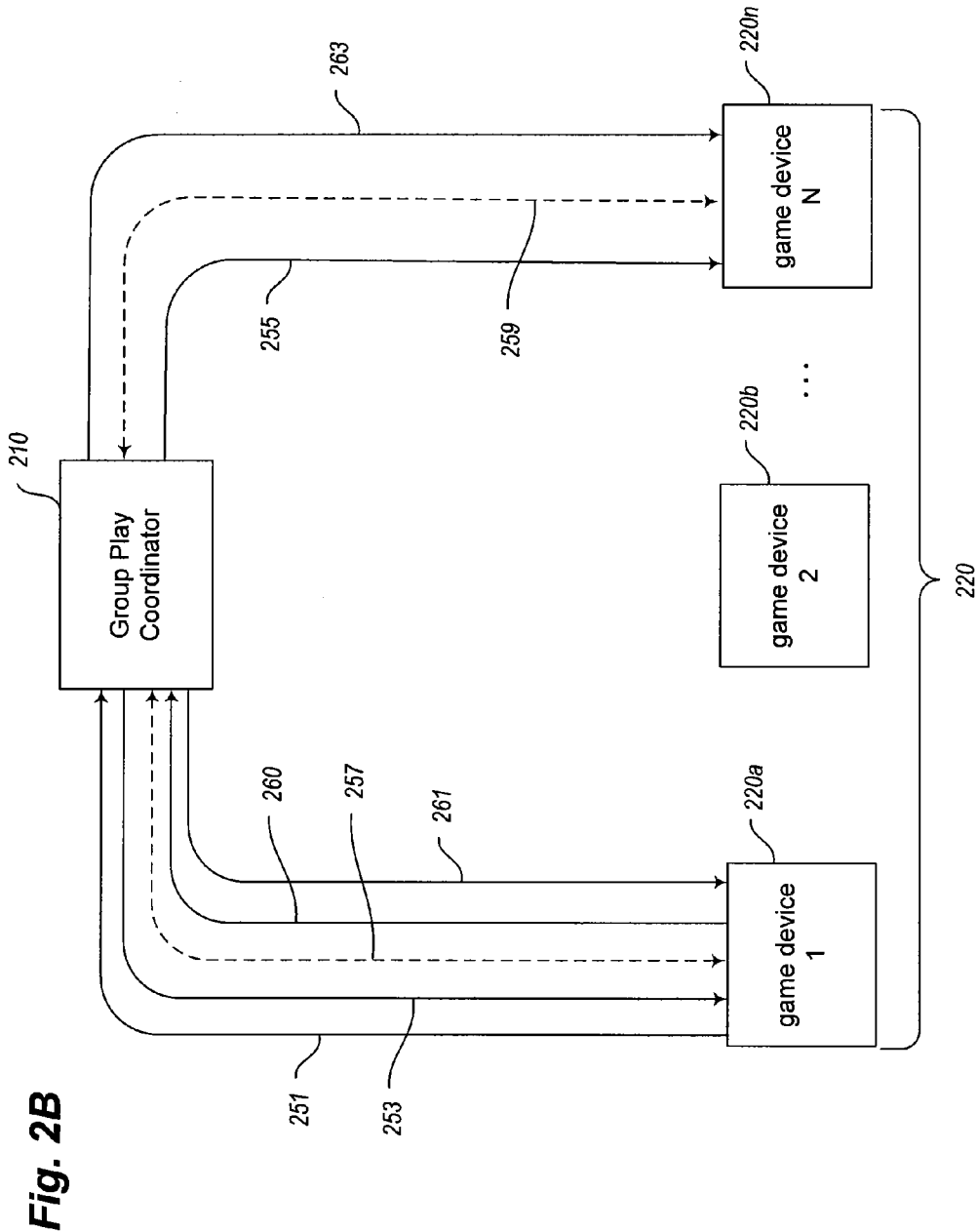

FIGS. 2A and 2B illustrate examples of how a Group Play Coordinator 210 and multiple game devices 220a-220n (collectively 220) may interact to provide group play. For purposes of this example, the game devices 220 may each function as user interfaces to provide one or more primary games, bonus games, and games that include group play features. In addition, each of the example game devices 220 may further provide, from time to time, one or more intermediate bonus games to a respective player of the device, wherein each intermediate bonus game may trigger a group play event on the basis of an occurrence of at least one potential outcome of the intermediate bonus game. In addition, each of the game devices 220 maintains an eligibility score indicative of whether a respective player of the game device is eligible to participate in a group play event.

In particular, FIG. 2A depicts a number of game devices 220 interacting with a Group Play Coordinator 210. At some time prior to interaction 241, a player of a first game device 220a has been interacting with a primary game provided by the first game device 220a, and based upon the occurrence of a bonus game triggering event, an intermediate bonus game has been triggered (e.g., such as based upon by an occurrence of an outcome of a primary game, etc.). In interaction 241, the first game device 220a interacts with the Group Play Coordinator 210 to indicate that the intermediate bonus game has been triggered. This indication serves as a request from the first game device 220a for an adjusted probability value that may be use in setting a likelihood that the intermediate bonus game triggers a group play event based on one or more outcomes. In some embodiments, the first game device 220a may provide additional information in interaction 241, such as, for example, information related to the intermediate bonus game (e.g., identifier, type, number of options, etc.), the potential group play feature (e.g., identifier, type, etc.), eligibility score, etc. In some embodiments, the first game device 220a may not interact with the Group Play Coordinator upon the triggering of an intermediate bonus game, such as, for example, if the first game device 220a determines that it does not qualify for a group play event.

After receiving the indication in interaction 241, the Group Play Coordinator obtains eligibility scores from each game device in the group of game devices 220, here illustrated by interactions 243, 245, and 247, with the first game device 220a, a second game device 220b, and an nth game device 220n, respectively. As discussed in more detail elsewhere, an eligibility score may be a value indicating whether a user of a game device and hence the game device itself is eligible to participate in a group play event, and may be based on one or more of several factors (e.g., an amount of time the player has played, a rate at which the player is playing, an amount of time that has passed since the player last participated in a group play event, a status of the player, a level obtained by the player through game play, a score achieved by the player, an amount the player has wagered, an amount the player has won, a player worth, success rate, skill level, etc.).

In other embodiments, the eligibility scores may have been provided to the Group Play Coordinator 210 at a time prior to interaction 241, such as for example, based on one or more of the game devices 220 periodically providing the eligibility scores to the Group Play Coordinator, or the Group Play Coordinator periodically polling the game devices for such information. In some embodiments, the first game device 220a may send its eligibility score along with the indication that an intermediate bonus game has been triggered. In some embodiments, the eligibility scores of one or more game devices 220 may be maintained by the Group Play Coordinator 210, rather than by the one or more game devices 220. In some embodiments one or more of the game devices 220 may not return eligibility scores to the Group Play Coordinator 210, such as, for example, if no one is playing the one or more game devices.

After the Group Play Coordinator 210 obtains eligibility scores from the game devices, it determines which of the game devices 220 qualify to participate in the potential group play event, such that the qualified devices may participate in the group play event if the group play event is triggered by an outcome of the intermediate bonus game triggered by the first game device 220a. After the Group Play Coordinator 210 determines which of the devices qualify (if any), it determines an adjusted probability value for triggering the group play event, based at least in part on how many of the game devices 220 qualify to participate in the group play event, such as by one of the techniques described elsewhere.

The Group Play Coordinator 210 returns the adjusted probability value to the first game device 220a in interaction 249, such that the adjusted probability value may be used to set the likelihood that the intermediate bonus game will trigger a group play event. In addition, the first game device 220a may adjust any other outcomes of the intermediate bonus game in accordance with the provided adjusted probability value, such as, for example, to maintain the proportional odds of the other events occurring with respect to each other. In some embodiments, the adjusted probability value may indicate that there is no likelihood of triggering a group play event (e.g., such as a probability of 0), such that the group play event may not be triggered by the intermediate bonus game. After the first game device 220a receives the probability value and makes any appropriate adjustments, it may provide the intermediate bonus game to the player of the first game device 220a, such as by executing the intermediate bonus game on behalf of the player. In some embodiments, additional information, in addition to the adjusted probability value, may be provided to the first game device 220a via interaction 249, such as, for example, information related to other aspects of the intermediate bonus game (e.g., the type of group play event that may be triggered, a number of options to provide a player of the intermediate game, etc.), etc.

In some embodiments, the Group Play Coordinator 210 may provide information to each of one or more other game devices 220 indicating that the game device qualifies to participate in a potential group play event. For example, the Group Play Coordinator 210 may inform the nth game device 220n that it is qualified to participate in a potential group play event via optional interaction 250. For purposes of this example, the second game device 220b was determined not to qualify for the group play event, and, thus, does not receive notification. In some embodiments, the Group Play Coordinator 210 may update an overhead display, or other signage, with information related to the potential group play event.

Although, specific embodiments have been described above, it will be appreciated that the inventive techniques may apply in a wide variety of other embodiments. In some embodiments, for example, the first game device 220a may initiate interaction 241 at some time prior to triggering an intermediate bonus game or based upon the occurrence of another event (e.g., such as periodically, etc.). For example, a game device 220 may initiate an interaction to request an adjusted probability value from the Group Play Coordinator 210 for use in adjusting the likelihood of an occurrence of another event that triggers a group play event, such as one or more triggering events described elsewhere (e.g., an occurrence of an outcome of a primary game, etc.). In addition, a game device 220 may store a provided adjusted probability value for later use (e.g., such as for use when an intermediate bonus game is triggered at a future time, etc.), etc. In addition, in another example embodiment, the Group Play Coordinator 210 may automatically determine an adjusted probability value and provide the adjusted probability value to one or more game devices without prompting from the one or more game devices (e.g., such as periodically, etc.). In addition, although the first game device 220a is depicted as triggering an intermediate bonus game, and a subsequent group play event, it will be appreciated that any of the game devices 220 may instead, or in addition to the first game device 220a, trigger an intermediate bonus game and/or a group play event.

FIG. 2B continues the example of FIG. 2A at a time subsequent to interaction 249 of FIG. 2A. In this example, the first game device 220a executes an intermediate bonus game on behalf of a player of the first game device 220a, wherein the chances of the intermediate bonus game resulting in an outcome that triggers a group play event are adjusted in accordance with the adjusted probability value provided by the Group Play Coordinator 210 in interaction 249 of FIG. 2A. For the purposes of this example, the outcome generated by the execution of the intermediate bonus game, in accordance with the provided probability value, indicates that a group play event has been triggered. The first game device 220a notifies the Group Play Coordinator 210 via interaction 251 that the group play event has been triggered. In some embodiments, if an intermediate bonus game results in a non-triggering outcome, the game device may notify the Group Play Coordinator 210 that the group play event failed to occur. In such cases, the Group Play Coordinator 210 may notify the qualified game devices 220 or update overhead displays as appropriate to indicate the results.

After the Group Play Coordinator 210 receives notification of the group play event being triggered in interaction 251, the Group Play Coordinator 210 interacts with the one or more game devices 220 that qualify to participate in the group play event to initiate the group play event. In this example, the first game device 220a and the nth game device 220n were determined to qualify to participate in this group play event, and, accordingly, the Group Play Coordinator 210 initiates the group play event on the first game device 220a and the nth game device 220n in interactions 253 and 255, respectively.

In some embodiments, the Group Play Coordinator 210 may pass one or more parameters to one or more of the game devices 220 determined to qualify to participate in the group play event, such as for use by the one or more game devices 220 to govern one or more aspects related to the performance of the group play event (e.g., aspects related to award type, award amount, award source, paytable identifier, number of interactive selection available for a player of the game device, etc). For example, in some embodiments, the Group Play Coordinator 210 may determine a potential award for each respective player of the game devices 220 that qualify to participate in a group play event based on eligibility scores obtained from the game devices 220 (e.g., using one or more techniques described elsewhere, etc.), such as in interactions 243, 245, and 247 of FIG. 2A. An embodiment of the Group Play Coordinator 210 may provide information about the potential awards to each of the game devices 220 as one or more parameters governing the group play event, such that the game devices 220 may award the respective players upon completion of the group play event based on the provided information.

After the group play event has been initiated on one or more game devices 220 that qualify to participate in the group play event, each of the qualified game devices 220 executes the group play event on behalf of a user of the game device. In various embodiments, the group play event may be synchronized by one or more various techniques. For example, in some embodiments, the Group Play Coordinator 210 may synchronize the start of the group play event by notifying each qualified game device 220 that the group play event is imminent, such as, for example, by providing one or more parameters to the game devices 220, and then instructing all the game devices 220 to begin the group play event after all the game devices 220 have notified the Group Play Coordinator 210 that they are ready to participate in the group play event (e.g., such as after each game device 220 has wound down a primary game, etc.).

After the group play event has been executed for the one or more game devices 220 that qualify to participate in the group play event, the game devices 220 may exchange intermediate result information with the Group Play Coordinator 210, such as via optional interactions 257 and 259. The Group Play Coordinator 210 may provide this information and/or other information related to the group play event to one or more of the game devices 220, such that the one or more game devices 220 may control various aspects of the group play event or update displays provided for players of the game devices 220 (e.g., such as to display the progress of other participants in the group play event). In some embodiments, the Group Play Coordinator 210 may also use the information provided by the game devices during the group play event to control various aspects of the group play event, such as to determine when to terminate the group play event, etc. In some embodiments, the Group Play Coordinator 210 may display various aspects related to the provided intermediate results information on one or more overhead displays, etc.

The first game device 220a and the nth game device 220n may notify the Group Play Coordinator 210 that the group play event has completed on each respective game device, such as via interaction 260 and optional interaction 259, respectively. In addition, in these interactions, the game devices 220 may provide final results of the group play event to the Group Play Coordinator 210. The Group Play Coordinator 210 may summarize results of the group play event and provide the summarized results to the one or more game devices 220 that participated in the group play event, such as via interactions 261 and 263. The Group Play Coordinator 210 and the game devices 220 may update any displays with the final results information as appropriate.

After completion of the group play event, the game devices 220 that participated in the group play event may each provide an award to a player of the game device as appropriate, such as, for example, based on the parameters provided to the game device from the Group Play Coordinator 210. In some embodiments, the final summarized results provided by the Group Play Coordinator 210 to the game device may indicate an award to be provided to a player of a game device. In addition, after the group play event has been completed, the game devices 220 that participated in the group play event may return to a normal mode of operation, such as, for example, return to providing one or more primary games for players of the game devices 220.

In some embodiments, when a game device 220 triggers an event related to a potential group play event, such as when a game device 220 triggers an intermediate bonus game, a group play event identifier may be generated for use in messaging between the one or more game devices 220 and the Group Play Coordinator 210. The generated group play event identifier may be a timestamp, an alphanumeric value, or other value, etc., and may be associated with the particular group play event. In various embodiments, the group play event identifier may be generated by a game device 220 triggering the event or by the Group Play Coordinator 210. The generated group play event identifier may be provided with any message exchanged between the various game devices 220 and Group Play Coordinator 210 related to the group play event, and may be used for purposes related to managing multiple group play events by a single Group Play Coordinator 210, resolving precedence conflicts arising from near simultaneously generated events, managing failure recovery, etc.

Figure 3:
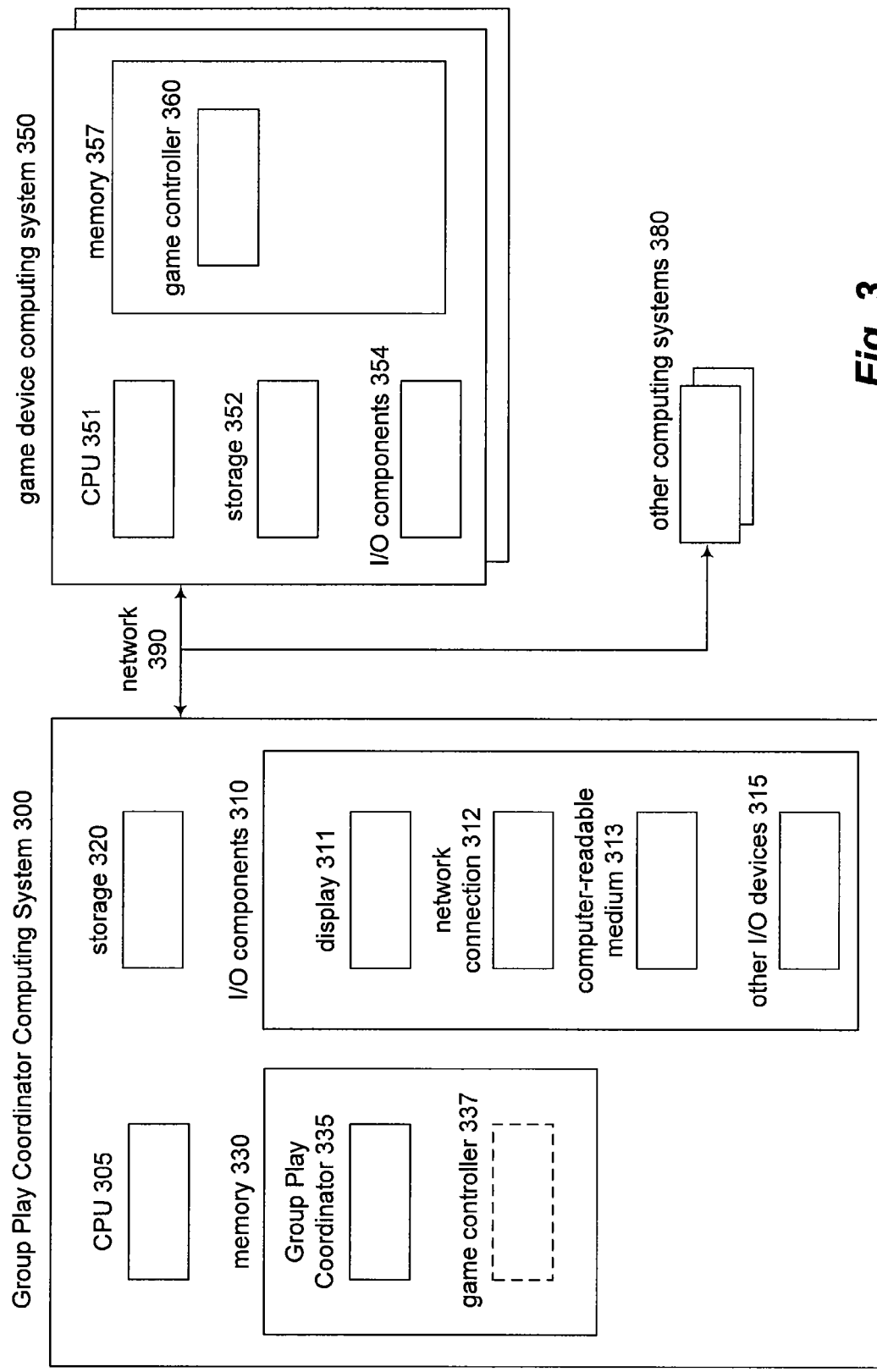
FIG. 3 is a block diagram illustrating an example computing system suitable for executing an embodiment of a software system for providing group play with multiple game devices.

FIG. 3 is a block diagram illustrating an example computing system suitable for performing techniques for providing group play with multiple game devices. In particular, FIG. 3 illustrates a Group Play Coordinator computing system 300 suitable for executing an embodiment of a Group Play Coordinator, as well as various game device computing systems 350, and other computing systems 380. In the illustrated embodiment, the Group Play Coordinator computing system 300 has components that include a CPU 305, various I/O components 310, storage 320, and memory 330. The I/O components include a display 311, a network connection 312, a computer-readable media drive 313, and other I/O devices 315 (e.g., a mouse, keyboard, speakers, overhead displays, etc.).

In this illustrated embodiment, a software Group Play Coordinator program 335 is executing in memory 330 to provide a Group Play Coordinator, which interacts with the game device computing systems 350, and the other computing systems 380, over a network 390 using network connection 312 (e.g., via a LAN, WAN, wireless network, cellular network, etc.). In particular, one of the game device computing system 350 may interact with the Group Play Coordinator 335, such as via a game controller 360 executing in memory 357 of a game device computing system 350, in order to indicate that an intermediate bonus game has been triggered by the game device computing system and to obtain an adjusted probability value to adjust a probability that an outcome of the intermediate bonus game triggers a potential group play event on behalf of a player (not shown) of the game device and/or one or more other players of other game device computing systems. Upon receiving a request for an adjusted probability value, the Group Play Coordinator 335 obtains eligibility information from each of one or more game device computing systems 350, such as by interacting with a game controller 360 of the game device computing system, to determine whether a player of the game device qualifies to participate in the group play event. The Group Play Coordinator 335 determines how many of the game device computing systems qualify to participate in the group play event and determines an adjusted probability value based at least in part on how many of the game devices qualify. The Group Play Coordinator 335 may then provide the adjusted probability value to the game controller that indicated that the intermediate bonus game was triggered. Upon receiving an indication that the group play event was triggered from the game controller, the Group Play Coordinator may then initiate the group play event by interacting with one or more game device computing systems 350 that were determined to qualify for the group play event. The Group Play Coordinator 335 may store various information related to group play events in storage 320, such as, for example, the obtained eligibility information. In addition, an optional game controller program 337 may be executing in memory 330 in some embodiments, such as if the Group Play Coordinator computing system also functions as a game device.

In the illustrated embodiment, game device computing system 350 has components that include a CPU 351, various I/O components 354, storage 352, and memory 360. The I/O components may include components similar to those described with respect to the Group Play Coordinator Computing system 300 (e.g., a display, a network connection, a computer-readable media drive, and other I/O devices, etc.). A software game controller 360 executes in memory 357 to provide one or more games to a player interacting with the game device computing systems, including primary games, bonus games, intermediate bonus games, and group play games. In addition, game controller 360 interacts with the Group Play Coordinator 335 to obtain adjusted probability values for triggering group play events, such as upon an occurrence of an intermediate bonus game. The game controller 360 also interacts with the Group Play Coordinator 335 to notify the Group Play Coordinator 335 that the group play event has been triggered. The game controller 360 may also interact with the Group Play Coordinator 335 to provide eligibility information maintained by the game device computing system to the Group Play Coordinator 335 for use in determining which of the game devices qualify and an adjusted probability value. The storage 351 may store various information related to group play events, for example, information related to an eligibility score for the game device.

In some embodiments, other computing systems 380 may be provided, including one or more other Group Play Coordinator computing systems, game device computing systems, and/or computing systems related to management of game devices (e.g., computing systems provided to manage game device computing systems, etc.), etc.

In some embodiments, a game device computing system 350 may include various input devices through which a player may interact with the game device, including one or more player-activated buttons, touch-sensitive bezel, joystick, trackball, mouse, game pad, tablet, scanner, etc. In addition, a game device computing system may also provide a currency acceptor configured to accept currency from a player of the device, including one or more coin slots, bill acceptors, etc. In another embodiment, the game device computing system may also include a card slot for receiving a financial card issued by a financial institution. In addition, a game device computing system may be configured to include a voucher printer to encode and dispense vouchers.

Those skilled in the art will appreciate that the computing systems 300, 350 and 380 are merely illustrative and are not intended to limit the scope of the embodiments of the present disclosure. For example, the systems may instead be executed by multiple interacting computing systems or devices, and may be connected to other devices that are not illustrated, including through one or more networks such as the Internet, via the World Wide Web ("Web"), or other electronic communications network (e.g., cellular based network, public switched telephone network). More generally, computing system or device may comprise any combination of hardware or software that can interact in the indicated manners, including (without limitation) desktop or other computers, network devices, PDAs, cellphones, wireless phones, pagers, electronic organizers, Internet appliances, television-based systems (e.g., using set-top boxes and/or personal/digital video recorders), game consoles, media players and various other consumer products that include appropriate inter-communication capabilities. In addition, the functionality provided by the system 340 may in some embodiments be distributed in various components. Similarly, in some embodiments, some of the functionality of the Group Play Coordinator 335 and the game controller 360 may not be provided, and/or other additional functionality may be available.

Those skilled in the art will also appreciate that, while various items are discussed or illustrated as being stored in memory or on storage while being used, these items or portions of them may be transferred between memory and other storage devices for purposes of memory management and data integrity. Alternatively, in other embodiments some or all of the software systems or components of those systems may execute in memory on another device and communicate with the illustrated computing systems via inter-computer communication. Furthermore, in some embodiments, some or all of the systems and/or components may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the systems, components and/or data structures may also be stored (e.g., as executable or other machine-readable software instructions or structured data) on a computer-readable medium, such as a hard disk, a memory, a network, or a portable media article to be read by an appropriate drive or via an appropriate connection. The systems, components and data structures may also be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
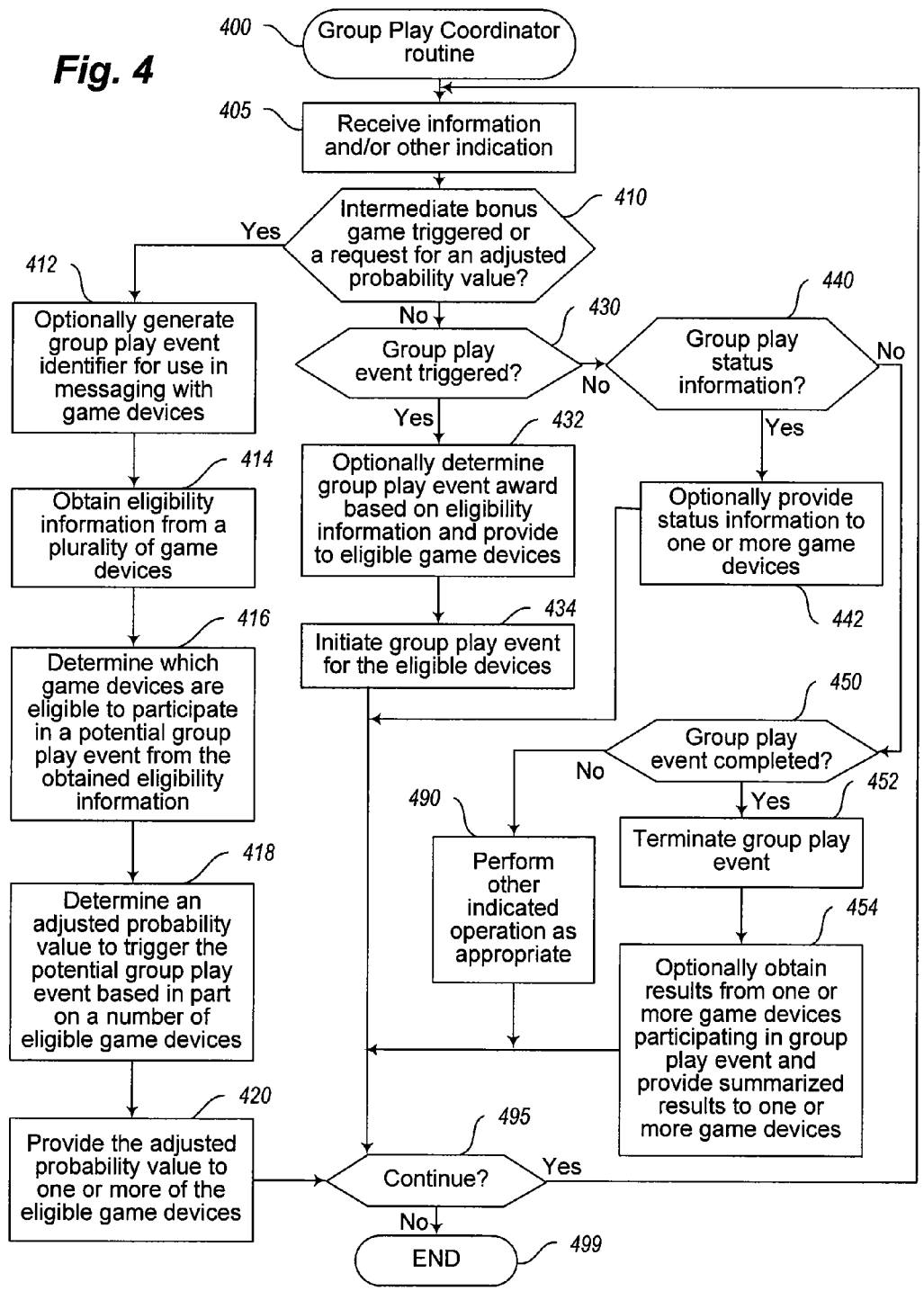
FIG. 4 is a flow diagram illustrating an example embodiment of a Group Play Coordinator routine.

FIG. 4 shows an example embodiment of a Group Play Coordinator routine 400. The routine may be provided by, for example, execution of the Group Play Coordinator 110 of FIG. 1 and/or the Group Play Coordinator 335 of FIG. 3, such as to coordinate group play events with multiple game devices. The illustrated embodiment of the routine 400 begins at block 405, where an indication is received of information related to a group play event and/or of other indications. The routine continues to block 410 to determine whether a game device has triggered an intermediate bonus game or is requesting an adjusted probability value, such that the requesting/triggering game device may adjust a likelihood of generating a potential group play event based in part on the adjusted probability value. If so, the routine continues to block 412 to optionally generate a group play event identifier for use in messaging with one or more game devices related to the potential group play event. The routine then continues to block 414 to obtain eligibility information from one or more game devices, such as eligibility scores maintained by each of the game devices. Each eligibility score obtained from a game device may be used to determine whether the game device is eligible to participate in a potential group play event. An eligibility score may be based on factors related to a player's activity at a respective game device, including, for example, an amount of time that the player has played, an average amount wagered by the player, a rate at which the player is playing, etc. Alternatively or additionally, the eligibility score may be based on some other characteristic of the player, for example, a status level assigned to the player under a loyalty program (e.g., player club card, etc.). In some embodiments, the obtained eligibility information may be stored for later use by the Group Play Coordinator, such as for use in determining an award for each of the eligible game devices.

After block 414, the routine continues to block 416 to determine which of the one or more game devices are eligible to participate in the potential group play event based on the obtained eligibility information. For example, the eligibility information obtained from the game devices may each indicate whether a respective game device is eligible or not based on various criteria. The routine then continues to block 418 to determine an adjusted probability value that is an adjustment to a probability of the potential group play event occurring based in part on how many game devices were determined to be eligible in block 416. For example, the adjusted probability value may be determined such that the potential group play event may be triggered to occur by any of a number of eligible game devices with a likelihood that approximates an overall target probability for the group play event to occur, regardless of how may game devices are eligible, such as by using one or more techniques describe elsewhere herein. Such may be referred to as normalizing the probability over the number of eligible game devices. After block 418, the routine continues to block 420 to provide the determined adjusted probably value to one or more of the eligible game devices. In particular, the adjusted probability value may be provided to at least the game device that triggered the intermediate bonus game, such that the game device may adjust a likelihood of the intermediate bonus game generating the potential group play event based in part on the adjusted probability value.

If it was instead determined in block 410 that the received request or indication did not trigger an intermediate bonus game or request an adjusted probability value, the routine may continue instead to block 430 to determine whether a group play event was triggered by a game device. In the illustrated embodiment, a game device may trigger a group play event from one or more events that occur on the game device, including, in particular, the occurrence of an outcome of an intermediate bonus game. For example, a game device that indicates in block 410 that the game device triggered an intermediate bonus game, may later notify the Group Play Coordinator that the outcome of the intermediate bonus game triggered the group play event. In some embodiments, the Group Play Coordinator may determine which of multiple group play events is referenced by the received triggering indication based on an associated group play event identifier provided with the request, such as an identifier generated in optional block 412. In the illustrated embodiment, if it is determined that a group play event is triggered, the routine may continue to block 432 to optionally determine an award for each of the one or more eligible game devices based at least in part on the eligibility information obtained in block 414, and to provide information related to the award to each appropriate eligible game device. For example, in some embodiments, awards may be apportioned from one or more progressive pools based on eligibility scores provided by the one or more game devices, such as using various techniques described elsewhere herein. The determined award information may be provided to the game devices in the form of one or more parameters indicative of one or more of various aspects of awards to be provided to a player of the game device, including, for example, one or more of award types, award amounts, award sources, paytable identifiers, etc. The game devices may use the award information to award a player upon completion of a group play event. After optional block 432, the routine may continue to block 434 to initiate the group play event on the eligible game devices.

If it was instead determined in block 430 that the received indication did not trigger a group play event, the routine may proceed to block 440 to determine whether intermediate status information related to a group play event is received from a game device participating in the group play event. If so, the routine may continue to block 442 to optionally provide the received status information to one or more other game devices participating in the group play event. The Group Play Coordinator may also update one or more displays with information related to the status of the group play event. If it was instead determined in block 440 that status information is not received, the routine may continue to block 450 to determine whether an indication is received that the group play event has completed. If so, the routine may proceed to block 452 to terminate the group play event. In some embodiments, the Group Play Coordinator may notify one or more other game devices that the group play event has been completed and that the one or more other game devices should terminate the group play event. In other embodiments, a group play event may not be terminated until after an indication is received from all participants in the group play event that the event has completed. After a group play event is terminated, the routine may proceed to block 454 to optionally obtain final result information from each of the participants in the group play event, such that the results may be summarized and provided back to each of the participants. The results summary may be used by each of one or more game devices to determine an award for a player of the game device. The Group Play Coordinator may also update one or more displays with information related to the summarized results. If it was instead determined at block 450 that a received indication did not indicate that a group play event was completed, the routine may continue to block 490 to perform other indicated operations as appropriate.

After blocks 420, 434, 442, 454, or 490, the routine may continue to block 495 to determine whether to continue. If so, the routine may return to block 405, and if not may continue to block 499 and ends.

Figure 5A:
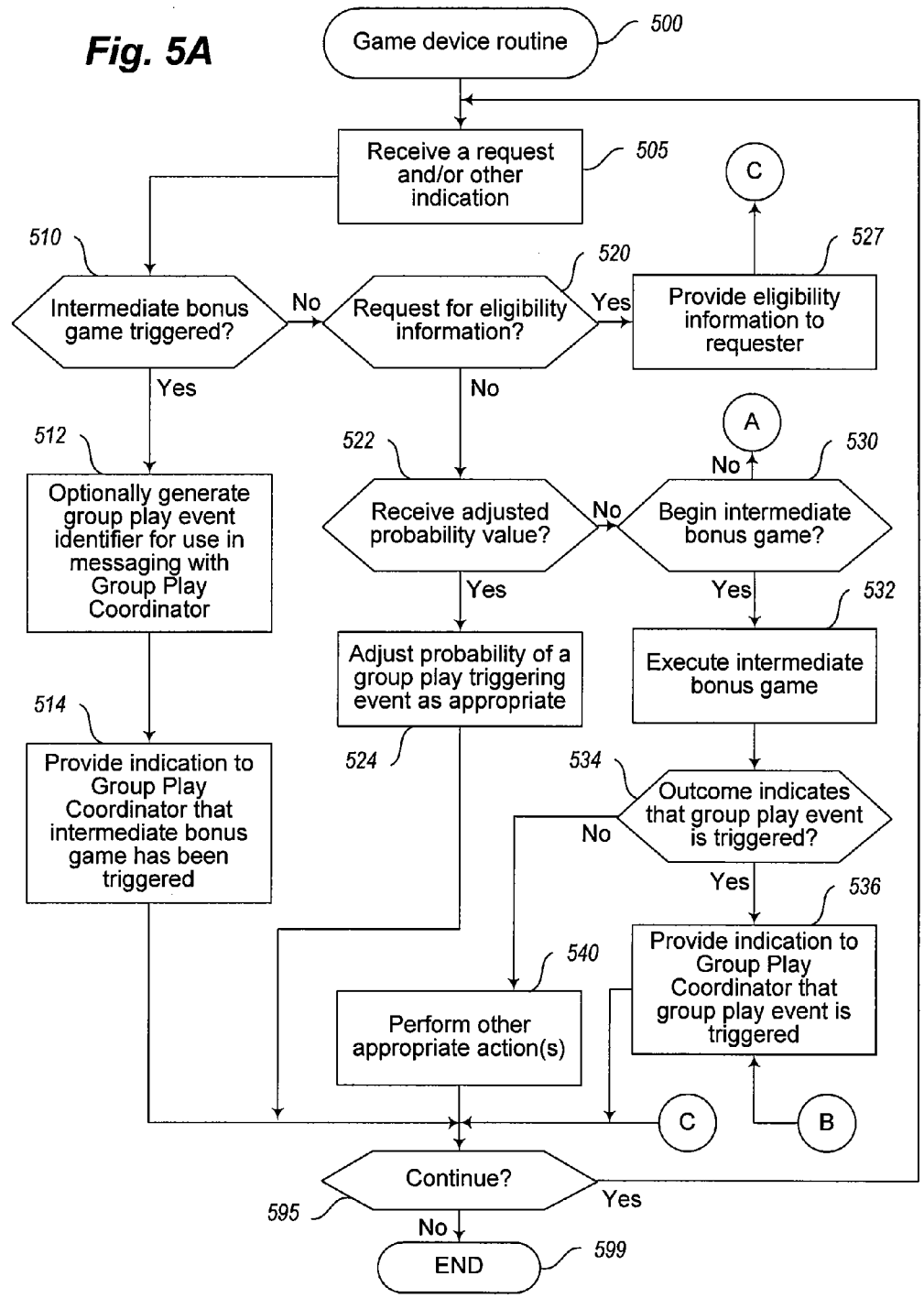
FIGS. 5A and 5B are a flow diagram illustrating an example embodiment of a game device routine.
Figure 5B:
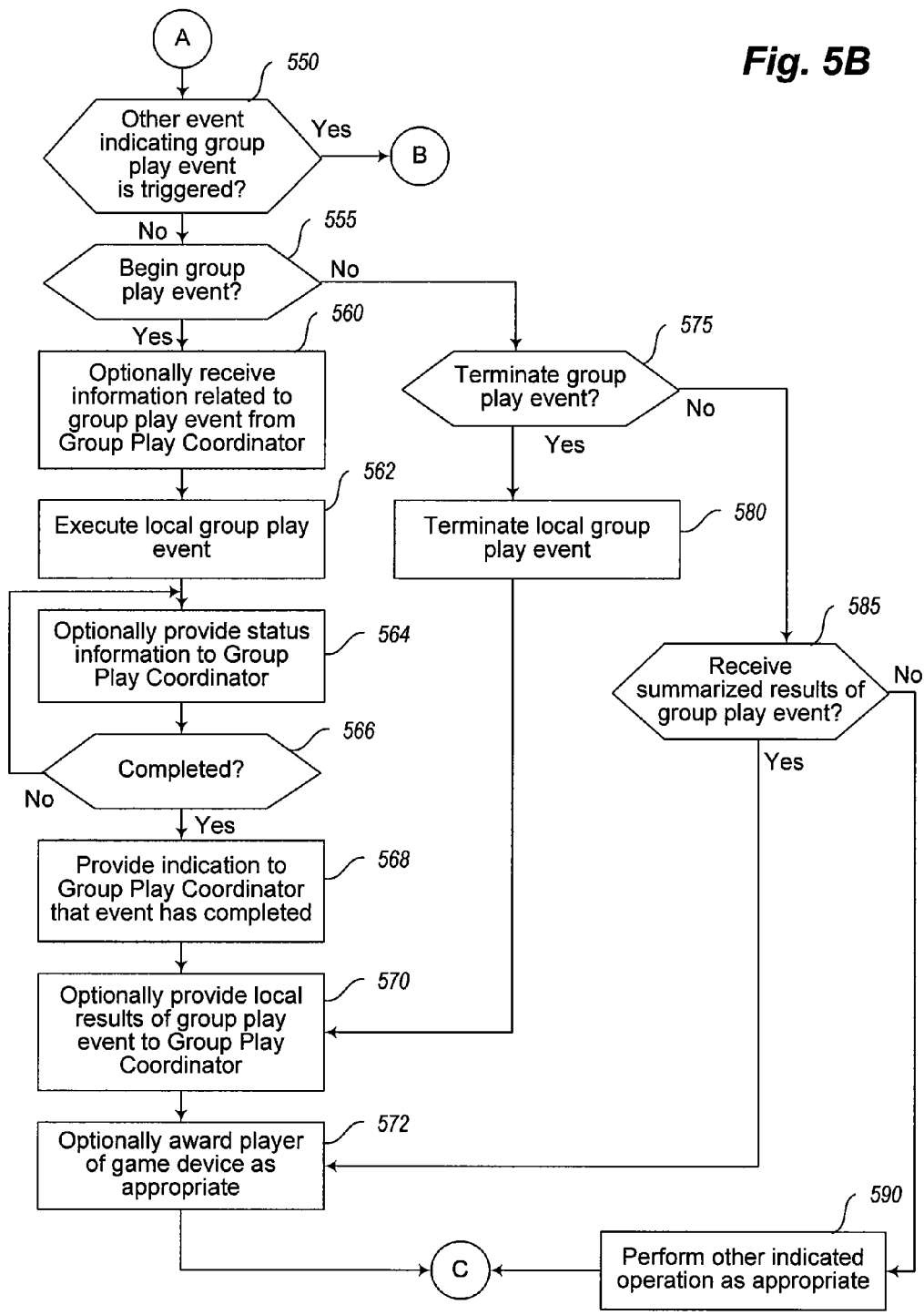

FIGS. 5A and 5B show an example embodiment of a game device routine 500. The routine may be provided by, for example, execution of one of game devices 120 of FIG. 1, one of the game device game controllers 360 of FIG. 3, and/or one of the game device game controllers 337 of FIG. 3, such as to provide group play with multiple game devices and a Group Play Coordinator. In the illustrated embodiment, only a subset of the activities of each such game device and/or game device game controller is illustrated, in particular for a subset of activities related to interactions with an embodiment of a Group Play Coordinator (e.g., as described with respect to routine 400 of FIG. 4). It will be appreciated that each such game device and/or game device game controller will further provide various player-specific capabilities to players of the game device and take various corresponding actions, which are not illustrated here for the sake of brevity.

The illustrated embodiment of the routine 500 begins at block 505, where an indication is received of a request from a Group Play Coordinator or another indication related to an group play events. The routine continues to block 510 to determine whether an indication that an intermediate bonus game has been triggered is received. In the illustrated embodiment, the game device executing the game device routine 500 may also be the game device that triggered the intermediate bonus game. If it is determined that the game device triggered an intermediate bonus game, the routine may continue to block 512 to optionally generate a group play event identifier for use in messaging with an embodiment of the Group Play Coordinator. Next, the routine may continue to block 514 to provide an indication to the Group Play Coordinator that the intermediate bonus game has been triggered, so as the game device may obtain an adjusted probability value to adjust the likelihood of the intermediate bonus game triggering a group play event.

If it was instead determined in block 510 that an intermediate bonus game was not triggered, the routine may continue to block 520 to determine whether a request for eligibility information has been received from the Group Play Coordinator. In the illustrated embodiment, the Group Play Coordinator requests eligibility information from a game device if at least one of multiple game devices, potentially including the game device, requests an adjusted probability value from the Group Play Coordinator (or triggers an intermediate bonus game). If so, the routine proceeds to block 527 to provide eligibility information to the Group Play Coordinator, such as an eligibility score maintained by the game device. If it was instead determined in block 520 that a request for eligibility information was not received, the routine may continue to block 522 to determine whether an adjusted probability value was received from the Group Play Coordinator. If so, the routine proceeds to block 524 to adjust the probability of one or more group play triggering events. For example, if the game device requested an adjusted probability in block 514 upon the triggering of an intermediate bonus game, the game device may adjust the probability for the intermediate bonus game triggering the group play event based on the provided adjusted probability value. In other embodiments, a game device may adjust the likelihood that one or more other events may trigger a group play event based on the received adjusted probability value.

If it was instead determined in block 522 that an adjusted probability was not received, the routine may continue to block 530 to determine whether an indication has been received to begin an intermediate bonus game. If so, then the routine may continue to block 532 to execute the intermediate bonus game. In some embodiments, the routine may automatically proceed to block 530 from block 524, such as when an intermediate bonus game is adjusted in accordance with a received adjusted probability value. In other embodiments, the game device may automatically provide an indication to itself that an intermediate bonus game is to begin after adjusting an intermediate bonus game in accordance with a received adjusted probability value in block 524. In block 534, the routine determines whether as a result of executing the intermediate bonus game, an outcome of the intermediate bonus game triggered the group play event. If so, the routine may continue to block 536 to provide an indication to the Group Play Coordinator that the group play event has been triggered. If not, the routine may proceed to block 540 to perform other appropriate actions, such as to provide an award to a player of the game device based on the outcome of the intermediate bonus game, to return to a primary game, to terminate a player's session with the game device, etc.

If it was instead determined in block 530 that an indication to begin an intermediate bonus game was not received, the routine may continue to block 550 to determine whether an indication has been received that another event occurred to trigger a group play event (e.g., an outcome of a primary game, a random event, etc.). If so, the routine may proceed to block 536 to provide an indication to the Group Play Coordinator that a group play event has been triggered. If it was instead determined in block 550 that an indication of another triggering event was not received, the routine may continue to block 555 to determine whether an indication has been received from the Group Play Coordinator to begin a group play event. In the illustrated embodiment, the Group Play Coordinator may indicate to a game device to begin a group play event by providing an indication that the event has been initiated. In some embodiments, the Group Play Coordinator may synchronize the start of the group play for one or more game devices participating in the group play event. If an indication was received to begin the group play event, block 560 optionally receives information related to the group play event from the Group Play Coordinator, such as, for example, information related to a potential award to be provided to a player of the game device as a potential result of the group play event (e.g. a paytable identifier, etc.).

In block 562 the routine executes the local group play event for a player of the game device. In block 564, the routine optionally provides intermediate status information related to the group play event to the Group Play Coordinator. At 566, the routine determines whether the group play event has completed, and if not the routine may continue to block 564. If so, the routine may continue to block 568 to provide an indication to the Group Play Coordinator that the group play event has completed. After block 568, the routine may continue to block 570 to optionally provide information related to the results of the group play event to Group Play Coordinator. In block 572, the routine optionally awards a player of the game device. In some embodiments, the award may be based on the award information received in block 560.

If it was instead determined at block 555 that an indication to begin the group play event was not received, the routine may continue to block 575 to determine whether an indication has been received to terminate the group play event. If so, the routine may continue to block 580 to terminate the group play event, then proceed to block 570 to optionally provide information related to the results of the group play event to Group Play Coordinator, and then continue to block 572 to optionally award a player of the game device. If it was instead determined in block 575 that an indication to terminate a group play event was not received, the routine may continue to block 585 to determine whether an indication of information related to summarized results of the group play event was received. If so, the routine may continue to block 572 to optionally award a player of the game device. In addition to optionally awarding the player, the game device may update one or more displays provided to a player of the game device with information associated with the summarized results of the group play event. If it was instead determined at block 585 that an indication of information related to summarized results of the group play event was not received, the routine may continue to block 590 to perform other indicated operations as appropriate. For example, the indicated operation may indicate that intermediate status information related to a group play event has been received by the game devices such that the game device may update one or more displays for a player of the game device with the information. As another example, the indicated operation may indicate that the game device is to execute a primary game, a bonus game, etc.

After blocks 514, 524, 527, 536, 540, 572, or 590, the routine may continue to block 595 to determine whether to continue. If so, the routine may return to block 505, and if not may continue to block 599 and ends.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the disclosure. In general in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A computer-implemented method to provide group play with multiple game devices, the method comprising:
    under the control of a group play coordinator computer system configured with executable instructions,
        for each of a plurality of game devices, obtaining eligibility information indicative of at least one characteristic related to a user of the game device;
        based at least in part on the obtained eligibility information, determining which of at least some of the plurality of game devices qualify to participate in a group play event before the group play event is triggered;
        based at least in part on a total number of game devices determined to qualify to participate in the group play event, determining an adjustment to a value that is indicative of a probability of triggering the group play event by any of the game devices qualified to participate in the group play event, where the adjustment to the value accommodates a variation over time in the total number of game devices that are determined to qualify to participate in the group play event by maintaining the probability of triggering the group play event constant regardless of the total number of game devices determined to qualify to participate in the group play event; and
        causing an adjustment of at least one group play event generator based on the determined adjustment to the value.

2. The method of claim 1 wherein determining an adjustment to a value that is indicative of a probability of an occurrence of a group play event includes determining at least one adjustment value that makes an aggregate probability of any of the total number of the game devices triggering the group play event at least normalize towards a target probability.

3. A computer-implemented method to provide group play with multiple game devices, the method comprising:
    under the control of a group play coordinator computer system configured with executable instructions,
        for each of a plurality of game devices, obtaining eligibility information indicative of at least one characteristic related to a user of the game device;
        based at least in part on the obtained eligibility information, determining which of at least some of the plurality of game devices qualify to participate in a group play event before the group play event is triggered;
        based at least in part on a total number of game devices determined to qualify to participate in the group play event, determining an adjustment to a value that is indicative of a probability of triggering the group play event by any of the game devices qualified to participate in the group play event, where the adjustment to the value accommodates a variation over time in the total number of game devices that are determined to qualify to participate in the group play event; and
        causing an adjustment of at least one group play event generator based on the determined adjustment to the value,
        wherein the determining the adjustment to a value that is indicative of a probability of an occurrence of a group play event includes determining at least one adjustment value that makes an aggregate probability of any of the total number of the game devices triggering the group play event normalize towards a target probability, and
        wherein determining the at least one adjustment value that makes an aggregate probability of any of the total number of the game devices triggering the group play event normalize towards a target probability includes determining a respective adjustment value for each of the game devices.

4. The method of claim 3 wherein causing an adjustment of at least one group play event generator based on the determined adjustment to the value includes providing the adjustment value to a respective one of the game devices.

5. The method of claim 3 wherein causing an adjustment of at least one group play event generator based on the determined adjustment to the value includes providing the adjustment value for a random number generator of a respective one of the game devices.

6. The method of claim 1 wherein determining which of at least some of the plurality of game devices qualify to participate in a group play event based at least in part on the obtained eligibility information includes determining at least one of an amount of time that the user has played, an average amount wagered by the user, a rate at which the user is playing, and a status level assigned to the user under a loyalty program.

7. The method of claim 1, further comprising:
    by the group play coordinator computer system, receiving an indication that the group play event has been triggered, the triggering of the group play event based at least in part on the determined adjustment; and
    in response to the received indication, initiating by the group play coordinator computer system the group play event for each of at least some of the game devices determined to qualify to participate in the group play event.

8. The method of claim 7, further comprising:
after initiating the group play event, providing by the group play coordinator computer system an award to at least one user of at least one of the at least some of the game devices determined to qualify to participate in the group play event.

9. The method of claim 8 wherein providing an award to at least one user of at least one of the at least some of the game devices determined to qualify to participate in the group play event includes providing the award as an amount apportioned from one or more progressive pools, and wherein the amount is based at least in part on the obtained eligibility information.

10. The method of claim 8 wherein providing an award to at least one user of at least one of the at least some of the game devices determined to qualify to participate in the group play event includes apportioning an award amount from one or more progressive pools based on an index value, the index value determined based at least in part on the obtained eligibility information.

11. The method of claim 8 wherein providing an award to at least one user of at least one of the at least some of the game devices determined to qualify to participate in the group play event includes selecting one or more progressive pools from which the award will be drawn based at least in part on the obtained eligibility information.

12. The method of claim 7, further comprising:
after initiating the group play event,
receiving by the group play coordinator computer system information indicative of results of the group play event from at least some of the at least some of the qualified game devices;
summarizing by the group play coordinator computer system the received information indicative of results of the group play event; and
providing by the group play coordinator computer system information indicative of the summarized results information to at least one of the at least some of the qualified game devices.

13. The method of claim 7 further comprising: providing by the group play coordinator computer system group play information to each of the at least some of the qualified game devices, the group play information at least in part governing aspects of the group play event.

14. The method of claim 13 wherein the group play information includes at least one of a potential amount to award the user, a pay table identifier, a number of free games, and a number of user selectable choices.

15. The method of claim 7, further comprising:
under the control of a game device determined to qualify to participate in the group play event,
receiving an indication that the group play event has been initiated;
executing the group play event based at least in part on the received indication that the group play event has been initiated;
providing an award to a user of the game device based at least in part on the results of the group play event.

16. The method of claim 15 wherein providing an award to the user of the game device determined to qualify to participate in the group play event includes providing the award as an amount apportioned from one or more progressive pools, and wherein the amount is based at least in part on the obtained eligibility information.

17. The method of claim 15 wherein providing an award to the user of the game device determined to qualify to participate in the group play event includes apportioning an award amount from one or more progressive pools based on an index value, the index value determined based at least in part on the obtained eligibility information.

18. The method of claim 15 wherein providing an award to the user of the game device determined to qualify to participate in the group play event includes selecting one or more progressive pools from which the award will be drawn based at least in part on the obtained eligibility information.

19. A computer-implemented method to provide group play with multiple game devices, the method comprising:
under the control of a group play coordinator computer system configured with executable instructions,
for each of a plurality of game devices, obtaining eligibility information indicative of at least one characteristic related to a user of the game device;
based at least in part on the obtained eligibility information, determining which of at least some of the plurality of game devices qualify to participate in a group play event before the group play event is triggered;
based at least in part on a total number of game devices determined to qualify to participate in the group play event, determining an adjustment to a value that is indicative of a probability of triggering the group play event by any of the game devices qualified to participate in the group play event, where the adjustment to the value accommodates a variation over time in the total number of game devices that are determined to qualify to participate in the group play event; and
causing an adjustment of at least one group play event generator based on the determined adjustment to the value; and
under the control of a game device,
assigning a value indicative of the determined adjustment to an occurrence of an outcome of an intermediate bonus game to be played by the user of the game device, the intermediate bonus game different from a primary game played by the user and different from the group play event; and
indicating that the group play event has been triggered as a result of the occurrence of the outcome of the intermediate bonus game.

20. The method of claim 1, further comprising:
under the control of a game device,
assigning a value indicative of the determined adjustment to an occurrence of a triggering event via the game device, the triggering event indicative of triggering the group play event;
based at least in part on the triggering event occurring, providing an indication that the group play event has been triggered.

21. A computer-implemented method to provide group play with multiple game devices, the method comprising:
under the control of a group play coordinator computer system configured with executable instructions,
for each of a plurality of game devices, obtaining eligibility information indicative of at least one characteristic related to a user of the game device;
based at least in part on the obtained eligibility information, determining which of at least some of the plurality of game devices qualify to participate in a group play event before the group play event is triggered;
based at least in part on a total number of game devices determined to qualify to participate in the group play event, determining an adjustment to a value that is indicative of a probability of triggering the group play event by any of the game devices qualified to participate in the group play event, where the adjustment to the value accommodates a variation over time in the total number of game devices that are determined to qualify to participate in the group play event; and causing an adjustment of at least one group play event generator based on the determined adjustment to the value; and under the control of a game device,
maintaining the eligibility information indicative of at least one characteristic related to the user of the game device;
receiving information indicative of the determined adjustment;
assigning a value indicative of the determined adjustment to an occurrence of a triggering event on the game device, the triggering event indicative of triggering the group play event;
based at least in part on the triggering event occurring, providing an indication that the group play event has been triggered;
receiving an indication that the group play event has been initiated; and
executing the group play event for the user.

22. The method of claim 1, further comprising:
for each of at least some of the game devices determined to qualify to participate in the group play event, providing information indicative of the determined eligibility to the game device.

23. A non-transitory computer-readable medium whose contents enable a computing device to provide group play with multiple game devices, by:
for each of a plurality of game devices, obtaining eligibility information indicative of at least one characteristic related to a user of the game device;
based at least in part on the obtained eligibility information, determining which of at least some of the plurality of game devices qualify to participate in a group play event before the group play event is triggered;
based at least in part on a total number of game devices determined to qualify to participate in the group play event, determining an adjustment to a value that is indicative of a probability of an occurrence of the group play event on any of the game devices qualified to participate in the group play event, where the adjustment to the value accommodates a variation over time in the total number of game devices that are determined to qualify to participate in the group play event by maintaining the probability of triggering the group play event constant regardless of the total number of game devices determined to qualify to participate in the group play event; and
causing an adjustment of at least one group play event generator based on the determined adjustment to the value.

24. A group play coordinator computing system configured to provide group play with multiple game devices, comprising:
at least one processor; and
at least one memory having executable instructions stored thereon that, when executed on the at least one processor, cause the at least one processor to provide group play with multiple game devices, by:
for each of a plurality of game devices, obtaining eligibility information indicative of at least one characteristic related to a user of the game device;
based at least in part on the obtained eligibility information, determining which of at least some of the plurality of game devices qualify to participate in a group play event before the group play event is triggered;
based at least in part on a total number of game devices determined to qualify to participate in the group play event, determining an adjustment to a value that is indicative of a probability of an occurrence of the group play event on any of the game devices qualified to participate in the group play event, where the adjustment to the value accommodates a variation over time in the total number of game devices that are determined to qualify to participate in the group play event by maintaining the probability of triggering the group play event constant regardless of the total number of game devices determined to qualify to participate in the group play event; and
causing an adjustment of at least one group play event generator based on the determined adjustment to the value.

25. The method of claim 1 wherein determining at least one adjustment value that makes an aggregate probability of any of the total number of the game devices triggering the group play event normalize towards a target probability includes determining a respective adjustment value for each of the game devices.

26. The method of claim 25 wherein causing an adjustment of at least one group play event generator based on the determined adjustment to the value includes providing the adjustment value to a respective one of the game devices.

27. The method of claim 25 wherein causing an adjustment of at least one group play event generator based on the determined adjustment to the value includes providing the adjustment value for a random number generator of a respective one of the game devices.

28. The method of claim 1, further comprising:
under the control of a game device,
assigning a value indicative of the determined adjustment to an occurrence of an outcome of an intermediate bonus game to be played by the user of the game device, the intermediate bonus game different from a primary game played by the user and different from the group play event; and
indicating that the group play event has been triggered as a result of the occurrence of the outcome of the intermediate bonus game.

29. The method of claim 1, further comprising:
under the control of a game device,
maintaining the eligibility information indicative of at least one characteristic related to the user of the game device;
receiving information indicative of the determined adjustment;
assigning a value indicative of the determined adjustment to an occurrence of a triggering event on the game device, the triggering event indicative of triggering the group play event;
based at least in part on the triggering event occurring, providing an indication that the group play event has been triggered;
receiving an indication that the group play event has been initiated; and
executing the group play event for the user.

* * * * *